US011159661B2

(12) United States Patent
Yoon et al.

(10) Patent No.: US 11,159,661 B2
(45) Date of Patent: Oct. 26, 2021

(54) CAMERA MODULE AND PORTABLE ELECTRONIC DEVICE INCLUDING THE SAME

(71) Applicant: Samsung Electro-Mechanics Co., Ltd., Suwon-si (KR)

(72) Inventors: Young Bok Yoon, Suwon-si (KR); Nam Ki Park, Suwon-si (KR); Bong Won Jeong, Suwon-si (KR); Sang Ho Seo, Suwon-si (KR); Jae Kyung Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/675,413

(22) Filed: Nov. 6, 2019

(65) Prior Publication Data
US 2020/0084308 A1    Mar. 12, 2020

Related U.S. Application Data

(63) Continuation of application No. 15/667,658, filed on Aug. 3, 2017, now Pat. No. 10,516,773.

(30) Foreign Application Priority Data

Oct. 13, 2016   (KR) .................. 10-2016-0133159
Oct. 28, 2016   (KR) .................. 10-2016-0142310
Feb. 24, 2017   (KR) .................. 10-2017-0024505

(51) Int. Cl.
*H04M 1/02*       (2006.01)
*H04N 5/232*      (2006.01)
(Continued)

(52) U.S. Cl.
CPC ............ *H04M 1/0264* (2013.01); *G02B 7/08* (2013.01); *G02B 7/10* (2013.01); *G02B 7/1821* (2013.01);
(Continued)

(58) Field of Classification Search
CPC ... H04M 1/0264; G02B 13/0035; G02B 7/08; G02B 7/1821; G02B 27/646; G02B 7/10;
(Continued)

(56) References Cited

U.S. PATENT DOCUMENTS 5,041,852 A      8/1991  Misawa et al.
5,241,422 A  *   8/1993  Shimada ................ G02B 7/10
                                                    359/694

(Continued)

FOREIGN PATENT DOCUMENTS

CN    101408653 A    4/2009
CN    207424496 U    5/2018
(Continued)

OTHER PUBLICATIONS

Chinese Office Action dated Jan. 2, 2020 in counterpart Chinese Patent Application No. 201710860599.X (11 pages in English and 9 pages in Chinese).

(Continued)

*Primary Examiner* — Timothy J Henn
(74) *Attorney, Agent, or Firm* — NSIP Law

(57) ABSTRACT

A camera module includes a lens module including lenses and a reflecting module disposed in front of the lens module. The reflecting module is configured to change a path of light to direct the light toward the lens module. The reflecting module includes a holder in which a reflecting member configured to change the path of the light is mounted and a first housing supporting the holder. The holder is configured to slide with respect to the first housing to enable rotation of the reflecting member with respect to a first axis and a second axis.

18 Claims, 20 Drawing Sheets

(51) Int. Cl.
  *G02B 27/64* (2006.01)
  *G02B 13/00* (2006.01)
  *G02B 7/08* (2021.01)
  *G02B 7/182* (2021.01)
  *G02B 7/10* (2021.01)
  *H04N 5/225* (2006.01)

(52) U.S. Cl.
  CPC ....... *G02B 13/009* (2013.01); *G02B 13/0015* (2013.01); *G02B 13/0035* (2013.01); *G02B 27/646* (2013.01); *H04N 5/2253* (2013.01); *H04N 5/2254* (2013.01); *H04N 5/2257* (2013.01); *H04N 5/23258* (2013.01); *H04N 5/23264* (2013.01); *H04N 5/23287* (2013.01); *G03B 2205/0053* (2013.01)

(58) Field of Classification Search
  CPC .............. G02B 13/0015; G02B 13/009; H04N 5/23287; H04N 5/23258; H04N 5/2257; H04N 5/2254; H04N 5/23264; H04N 5/2253; G03B 2205/0053
  See application file for complete search history.

(56) References Cited

U.S. PATENT DOCUMENTS

| | | | |
|---|---|---|---|
| 8,687,276 B2 | 4/2014 | Cho et al. | |
| 10,516,773 B2 * | 12/2019 | Yoon .................. | H04N 5/23264 |
| 2004/0174614 A1 | 9/2004 | Hovanky | |
| 2005/0057659 A1 * | 3/2005 | Hasegawa .......... | H04N 5/23248 348/208.11 |
| 2006/0269263 A1 | 11/2006 | Kim et al. | |
| 2008/0080053 A1 | 4/2008 | Homme | |
| 2008/0266404 A1 | 10/2008 | Sato | |
| 2009/0097837 A1 | 4/2009 | Chen et al. | |
| 2009/0122406 A1 | 5/2009 | Rouvinen et al. | |
| 2009/0185266 A1 | 7/2009 | Stromberg et al. | |
| 2010/0226010 A1 | 9/2010 | Kwan et al. | |
| 2011/0181955 A1 | 7/2011 | Cho et al. | |
| 2013/0242057 A1 | 9/2013 | Hong et al. | |
| 2015/0002683 A1 * | 1/2015 | Hu ..................... | G02B 26/0816 348/208.2 |
| 2015/0042870 A1 | 2/2015 | Chan et al. | |
| 2015/0198783 A1 * | 7/2015 | Shimotsu ............. | H02P 25/034 359/814 |
| 2015/0215541 A1 | 7/2015 | Nomura et al. | |
| 2015/0215542 A1 * | 7/2015 | Nomura ............... | H04N 5/2254 348/208.11 |
| 2016/0044247 A1 | 2/2016 | Shabtay et al. | |
| 2016/0070088 A1 * | 3/2016 | Koguchi ............. | G02B 13/009 359/696 |
| 2016/0161757 A1 | 6/2016 | Hee et al. | |
| 2018/0024329 A1 | 1/2018 | Goldenberg et al. | |
| 2018/0067335 A1 | 3/2018 | Chen et al. | |
| 2018/0095293 A1 | 4/2018 | Yeon et al. | |
| 2018/0109660 A1 | 4/2018 | Yoon et al. | |

FOREIGN PATENT DOCUMENTS

| | | |
|---|---|---|
| JP | 2006-337987 A | 12/2006 |
| JP | 3976683 B2 | 9/2007 |
| JP | 2016-12042 A | 1/2016 |
| KR | 10-2009-0122892 A | 12/2009 |
| KR | 10-2015-0091010 A | 8/2015 |
| WO | WO 02/079854 A2 | 10/2002 |

OTHER PUBLICATIONS

Korean Office Action dated Feb. 2, 2018, in corresponding Korean Patent Application No. 10-2017-0024505.

* cited by examiner

CAMERA MODULE AND PORTABLE ELECTRONIC DEVICE INCLUDING THE SAME

CROSS-REFERENCE TO RELATED APPLICATIONS

This application is a continuation of U.S. patent application Ser. No. 15/667,658 filed on Aug. 3, 2017, now U.S. Pat. No. 10,516,773 issued on Dec. 24, 2019, which claims the benefit under 35 U.S.C. § 119(a) of Korean Patent Application Nos. 10-2016-0133159 filed on Oct. 13, 2016, 10-2016-0142310 filed on Oct. 28, 2016, and 10-2017-0024505 filed on Feb. 24, 2017, in the Korean Intellectual Property Office, the entire disclosures of which are incorporated herein by reference for all purposes.

BACKGROUND

1. Field

The following description relates to a camera module and a portable electronic device including the same.

2. Description of Related Art

Recently, it has been common to adopt camera modules for use in portable electronic devices, such as smartphones, tablet PCs, laptop computers, and the like. Likewise, auto focusing (AF) functions, optical image stabilization (01S) functions, and zoom functions have been added to camera modules. However, in order to implement various additional functions, the structure of camera modules becomes complicated as a consequence, and their size increases. Thus, the corresponding size of portable electronic devices, including camera modules, may also increase.

In addition, in cases in which lenses or image sensors are directly moved to correct the shaking of a user's hand, the weight of lenses or image sensors and the weight of other members, including mounted lenses or image sensors, should all be considered. Thus, more than a single, specific level of driving power is required, which in turn causes power consumption to increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module having lenses and a reflecting module disposed in front of the lens module and configured to change a path of light to direct the light toward the lens module. The reflecting module includes a holder in which a reflecting member configured to change the path of the light is mounted and includes a first housing supporting the holder. The holder is configured to slide with respect to the first housing in order to enable rotation of the reflecting member with respect to a first axis and a second axis.

The holder of the camera module may be configured to be pressed toward the first housing. The camera module may include a first yoke disposed on one surface of facing surfaces of the holder and the first housing, and a magnet disposed on the other surface, where the first yoke and the magnet are configured to magnetically attract each other. The camera module may include a convex portion and a concave portion. The convex portion may protrude in a direction in which the holder is pressed. The convex portion may be disposed on one surface of facing surfaces of the holder and the first housing. The concave portion may be formed to be concave in the direction in which the holder is pressed and be disposed on the other surface.

The convex portion of the camera module may include support protrusions, and the concave portion of the camera module may include support grooves. The support grooves may include an inclined surface, and the support protrusions may be configured to be in point contact with the inclined surface of the support grooves. The support protrusions may be configured to slide along the inclined surface of the support grooves, thereby enabling rotation of the holder.

The convex portion of the camera module may be disposed to be spaced apart from the concave portion, with a support portion disposed between the convex portion and the concave portion. Each of the convex portion and the concave portion may include inclined surfaces, and the support portion may be disposed between respective inclined surfaces of the convex portion and inclined surfaces of the concave portion. The support portion may include ball members. A center point of the reflecting member may be formed at a meeting position at which extended lines of conceptual lines connecting a contact point of the ball members and the inclined surface of the convex portion meet with a contact point between the ball members and the inclined surface of the concave portion.

The magnets may be mounted in the holder and coils, respectively facing the magnets, may be disposed in the first housing. The lens module may further include a lens barrel having the lenses, a carrier with the lens barrel mounted inside, a second housing accommodating the carrier, and a driving portion configured to change a distance between the carrier and the reflecting module by moving the carrier.

The ball members guiding movement of the carrier may be disposed between the carrier and the second housing. The guide grooves in which the ball members are disposed may be formed on one or a combination of surfaces of facing surfaces of the carrier and the second housing. The guide grooves may be elongated in an optical axis direction of the lenses. The driving portion may include magnets mounted in the carrier and coils disposed in the second housing to face the magnets, as well as a second yoke mounted in the second housing, where the second yoke is configured to attract the magnets.

In a general aspect, a camera module includes a lens module including lenses, and a reflecting module disposed in front of the lens module. The reflecting module is configured to change a path of light to direct the light toward the lens module. The reflecting module also includes a holder and a first housing. A reflecting member configured to change the path of light is mounted on the holder. A first housing supports the holder. The holder is configured to slide with respect to the first housing, in order for the reflecting member to enable rotation with respect to a first axis and a second axis. The lens module comprises a lens barrel having the lenses and including a second housing accommodating the lens barrel. The lens barrel is configured to be pressed toward the second housing. The lens barrel is configured to slide in a direction different from a direction in which the lens barrel is pressed.

In a general aspect, a reflector is configured to direct incident light toward a lens module of an imaging component in an apparatus. The reflector includes a reflecting member configured to change a path of incident light, a holder in which the reflecting member is disposed, and a housing supporting the holder. The holder is configured to slide with respect to the housing to rotate the reflecting member, the rotation with respect to a first axis and a second axis.

The holder may further include a protrusion and the housing may further include a recess. The protrusion and the recess may be shaped to enable the sliding configuration. The protrusion and the recess may each be circular, triangular, rectangular, or polygonal. Support bearings may be disposed between the protrusion and the recess to enable the sliding configuration.

In a general aspect, an apparatus includes an outer housing configured to house components of the apparatus; and a first camera module disposed inside the outer housing. The first camera module is configured to image light incident on the apparatus on an axis perpendicular to an axis of incidence to the outer housing. The first camera module further includes a lens module including lenses, a reflecting member configured to change a path of incident light at a 90° angle, a holder in which the reflecting member is disposed, and an inner housing supporting the holder. The holder is configured to slide with respect to the inner housing to rotate the reflecting member, the rotation with respect to a first axis and a second axis.

The axis of incidence of the apparatus may be in a thickness direction of the apparatus, while the axis perpendicular to the axis of incidence may be in a width direction or a length direction. The camera module may further include a second camera module, where the second camera module is configured to image light incident on an axis of incidence. The apparatus may be a smartphone, a tablet, a personal computer (PC), a PC monitor, a laptop computer, a virtual reality (VR) apparatus, an augmented reality (AR) apparatus, or a mixed reality (MR) apparatus.

Other features and aspects will be apparent from the following detailed description, the drawings, and the claims.

Figure 1:
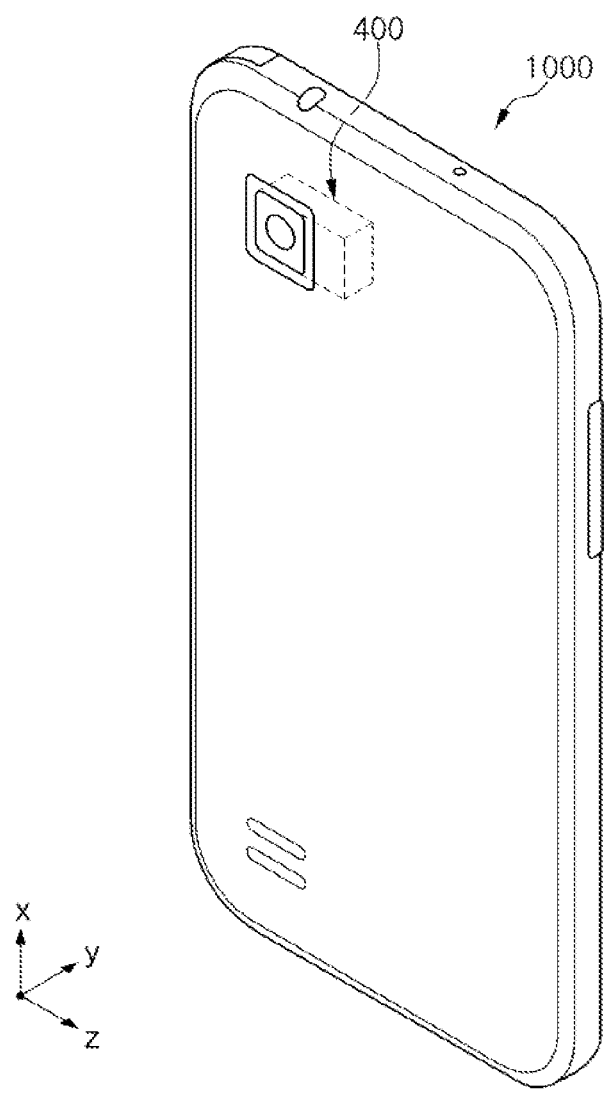
FIG. 1 is a perspective view of a portable electronic device according to an example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed as will be apparent to one skilled in the art, with the exception of operations necessarily occurring in a certain order. Also, descriptions of functions and constructions that are well known may be omitted for increased clarity or conciseness.

The features described herein may be embodied in different forms, and are not to be construed as being limited to the examples described herein. Rather, the examples described herein have been provided so that this disclosure will be thorough and complete, and will convey the full scope of the disclosure after an understanding of the application.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Subsequently, examples are described in further detail with reference to the accompanying drawings. Examples provide a camera module and a portable electronic device including the same, implementing a function, such as an auto focusing (AF) function, a zoom function, an optical image stabilization (01S) function, and the like, and having a relatively simple structure and a relatively small size. In addition, a camera module minimizing power consumption and a portable electronic device including the same are provided.

FIG. 1 is a perspective view of a portable electronic device according to an example. With reference to FIG. 1, a portable electronic device 1000 according to an example is provided as a portable electronic device, such as a mobile communications terminal, a smartphone, a tablet PC, or the like. As illustrated in FIG. 1, the portable electronic device 1000 includes a camera module 400 mounted therein, in order to image a subject. The camera module 400 includes a plurality of lenses.

In the example, the camera module 400 is configured to allow an optical axis (a Z axis) of the plurality of lenses to be disposed in a direction perpendicular to a thickness direction (a Y-axis direction, a direction from a front surface of a portable electronic device toward a rear surface thereof or the opposite direction) of the portable electronic device 1000. For example, the optical axis (the Z axis) of the plurality of lenses may be formed in a width direction or in a length direction of the portable electronic device 1000. Thus, even in cases where the camera module 400 includes a function, such as an AF function, a zoom function, or an OIS function, a thickness of the portable electronic device 1000 does not increase. Accordingly, the portable electronic device 1000 may be miniaturized.

The camera module 400 according to an example includes at least one among the AF function, the zoom function, and the OIS function. Thus, there is a limitation in miniaturizing the portable electronic device 1000. In more detail, in order to implement the zoom function, a length of a lens group of the camera module is relatively long. However, in a case in which an optical axis (the Z axis) of the lens group is formed in the thickness direction of a portable electronic device, the thickness of the portable electronic device also increases according to the length of the lens group. In a case in which the thickness of the portable electronic device is not increased, the length of the lens group is not sufficiently long, thereby degrading the zoom function.

In addition, in order to implement the AF function and the OIS function, an actuator is disposed to move the lens group in an optical axis direction or in a direction perpendicular to the optical axis. However, in a case in which the optical axis (the Z axis) of the lens group is formed in the thickness direction of the portable electronic device, the actuator to move the lens group is also disposed in the thickness direction of the portable electronic device. Thus, the thickness of the portable electronic device is increased. However, because the optical axis (the Z axis) of the plurality of lenses in camera module 400 is disposed in a direction perpendicular to the thickness direction of the portable electronic device 1000, the portable electronic device 1000 including additional functions may be miniaturized.

Figure 2A:
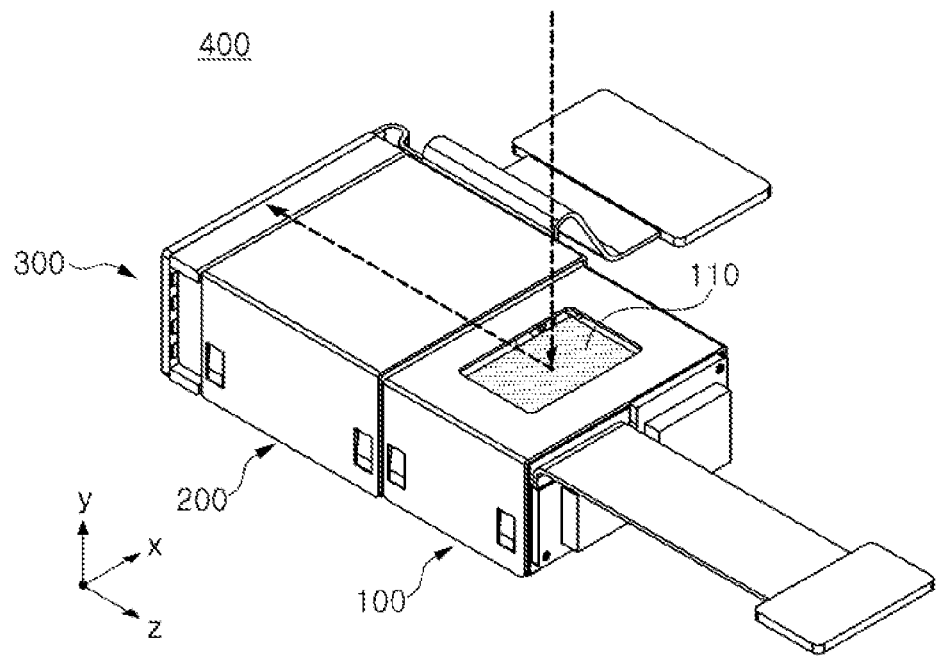
FIGS. 2A and 2B are perspective views of a camera module according to an example.
Figure 2B:
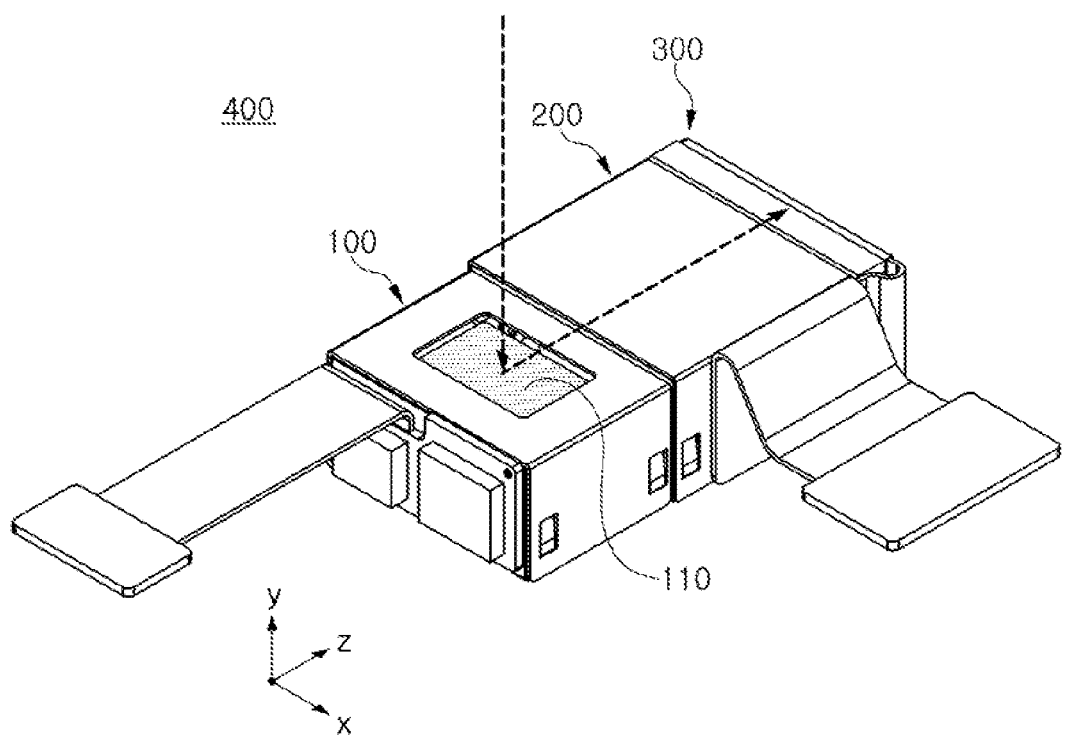
Figure 3:
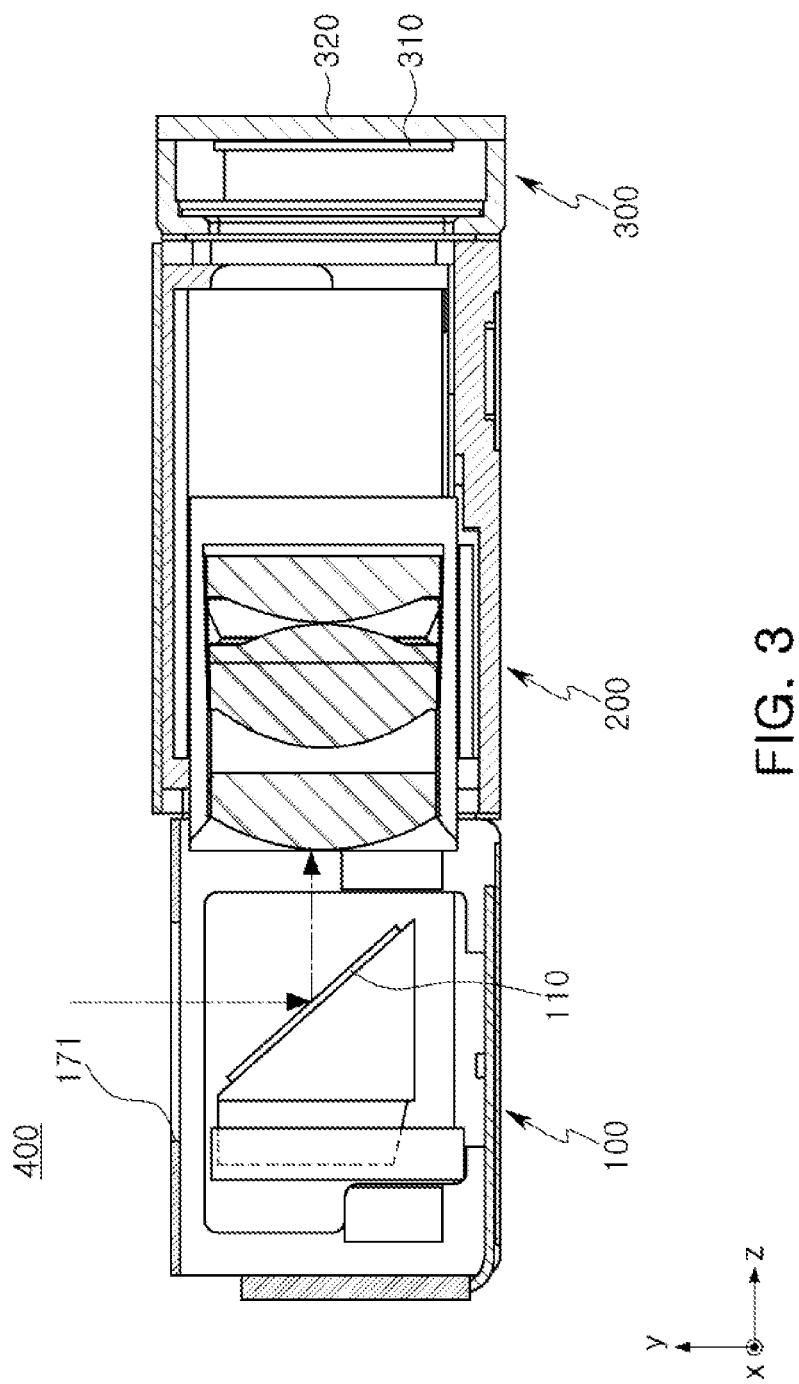
FIG. 3 is a schematic cross-sectional view of a camera module according to an example.

FIGS. 2A and 2B are perspective views of a camera module according to an example, while FIG. 3 is a schematic cross-sectional view of a camera module according to an example. With reference to FIGS. 2A, 2B, and 3, a camera module 400 according to an example includes a reflecting module 100, a lens module 200, and an image sensor module 300.

The reflecting module 100 is configured to change a direction of light emissions. For example, in the case of light incident through an opening (see 171 of FIG. 3) of the reflecting module 100, an emission direction thereof is changed to be toward the lens module 200 by the reflecting module 100. To this end, the reflecting module 100 includes a reflecting member 110 reflecting light. By the reflecting member 110, a path of light incident on the reflecting module 100 may be changed. Thus, the emission direction of the light incident through the opening 171 is changed to be directed toward the lens module 200 by the reflecting module 100. For example, the direction of light emissions is changed to be the same as the optical axis (the Z axis) direction by the reflecting module 100.

The lens module 200 includes a plurality of lenses through which the light travels, where the emission direction of the light has been changed by the reflecting module 100. The image sensor module 300 includes an image sensor 310 and a printed circuit board 320, in order to convert light having travelled through the plurality of lenses into an electrical signal.

A first joining member (see 280 of FIG. 19) is interposed between the reflecting module 100 and the lens module 200. The reflecting module 100 and the lens module 200 are combined by the first joining member 280. In addition, a second joining member (see 290 of FIG. 19) is interposed between the lens module 200 and the image sensor module 300. The lens module 200 and the image sensor module 300 are combined by the second joining member 290.

Figure 4:
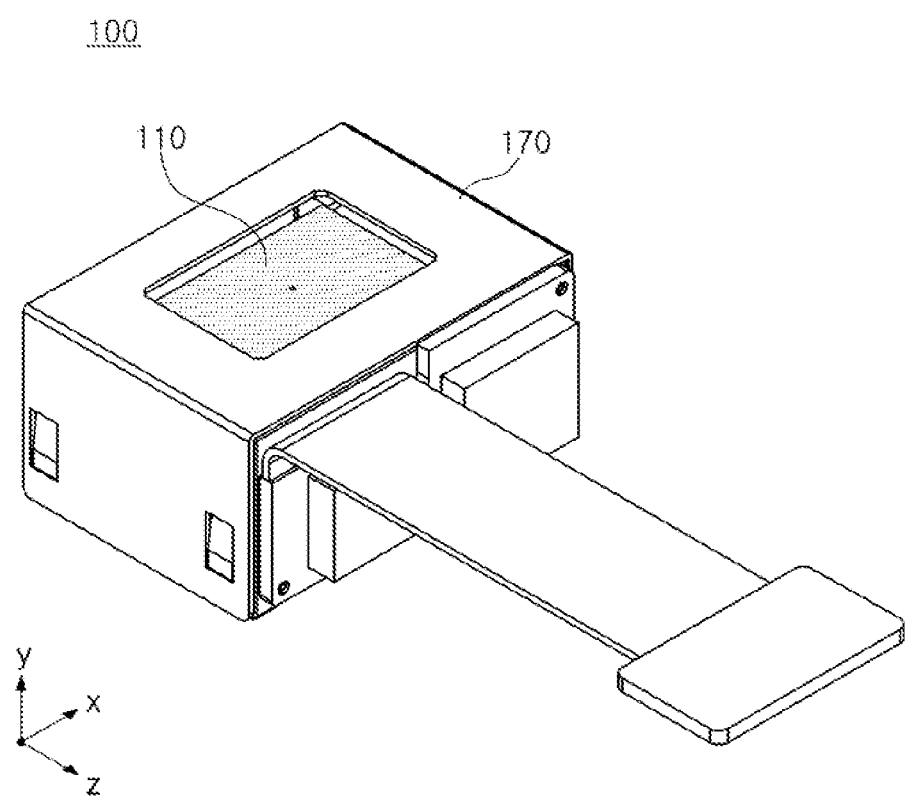
FIG. 4 is a perspective view of a reflecting module according to an example.
Figure 5:
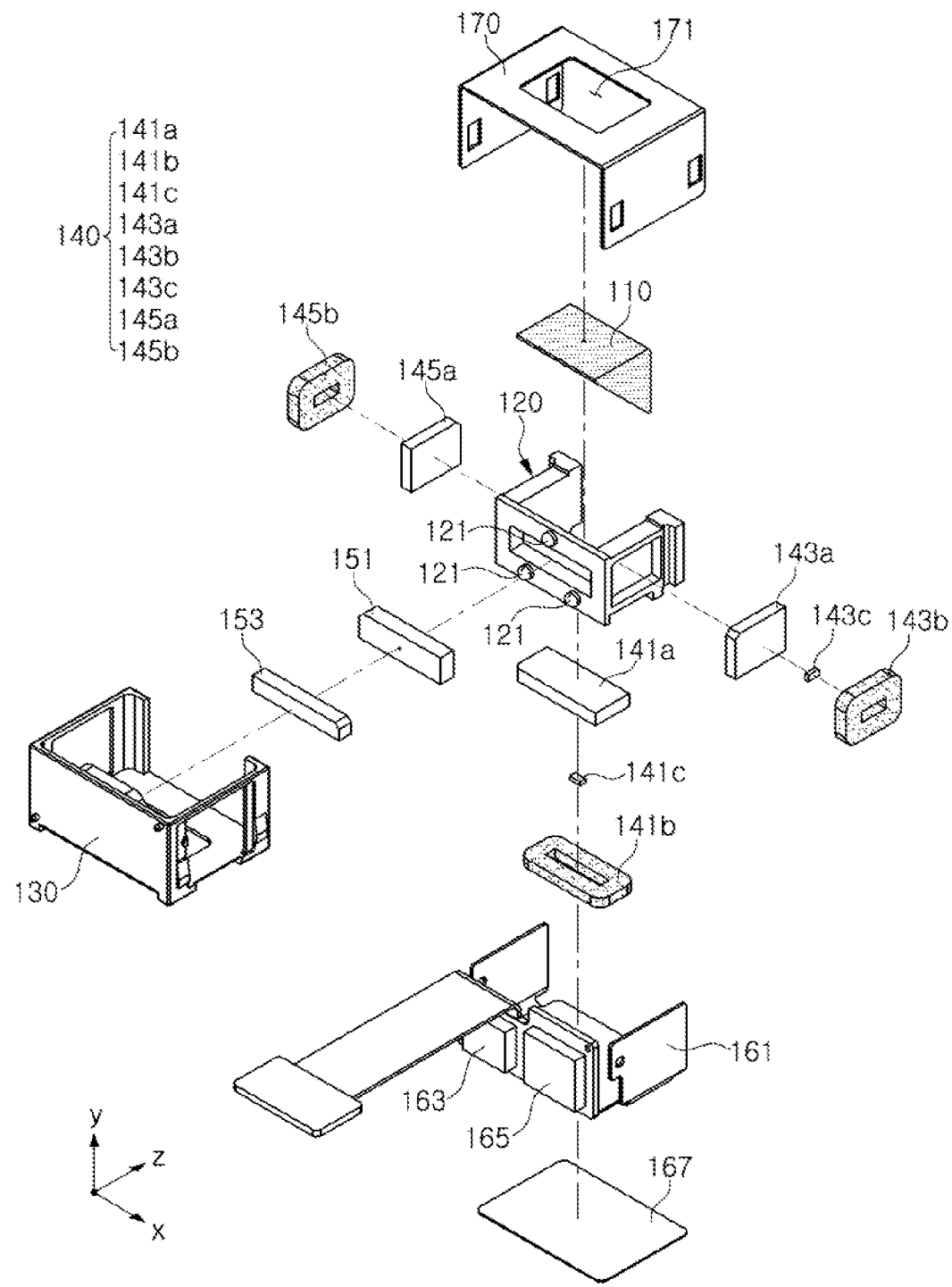
FIG. 5 is an exploded perspective view of the reflecting module according to an example.
Figure 6:
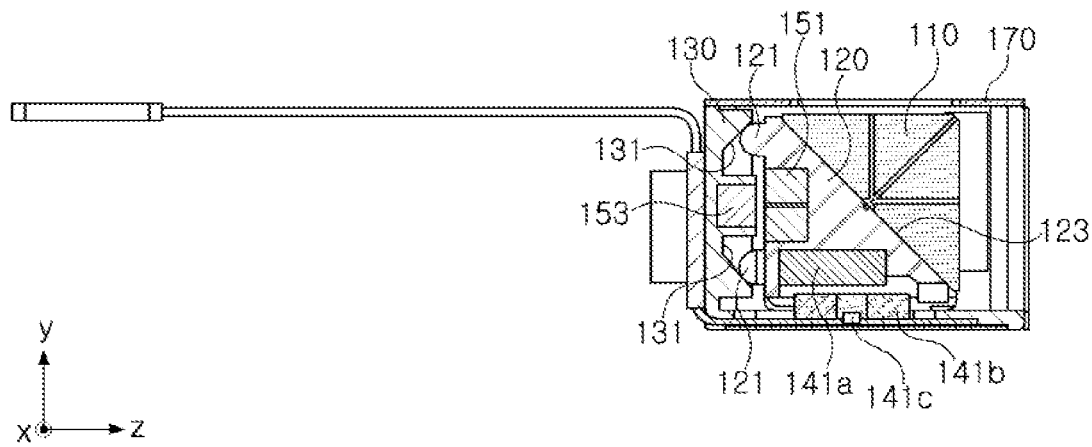
FIG. 6 is a schematic cross-sectional view of the reflecting module according to an example.
Figure 7:
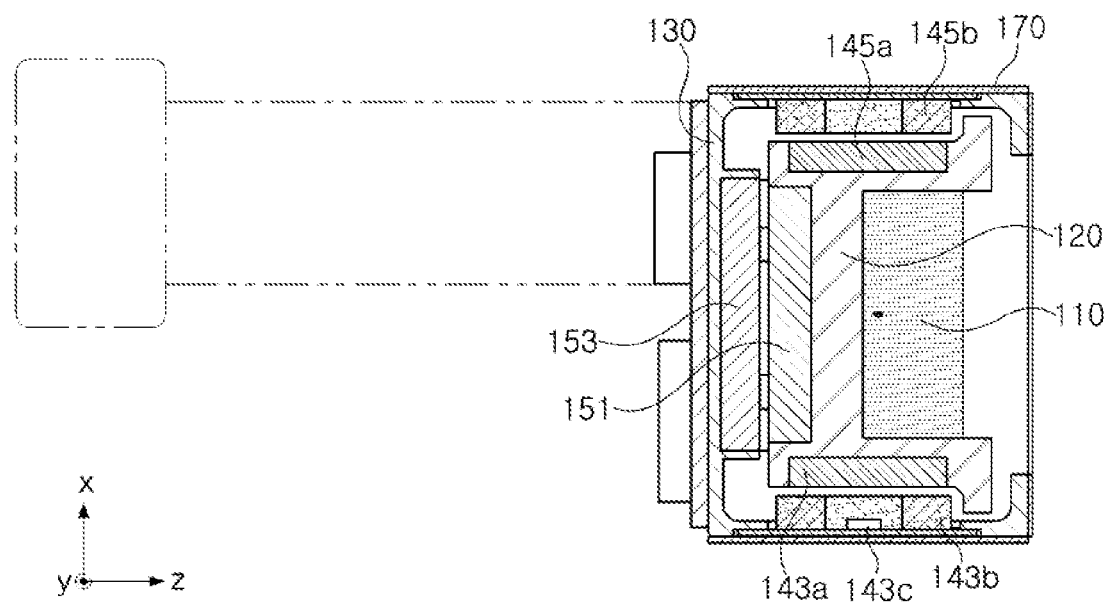
FIG. 7 is a schematic top view of the reflecting module according to an example.

FIG. 4 is a perspective view of a reflecting module according to an example, while FIG. 5 is an exploded perspective view of the reflecting module according to an example. FIG. 6 is a schematic cross-sectional view of the reflecting module according to an example, while FIG. 7 is a schematic top view of the reflecting module according to an example. With reference to FIGS. 4 to 7, a reflecting module 100 includes a reflecting member 110, a holder 120 including the reflecting member 110 mounted therein, a first housing 130 supporting the holder 120, a cover 170, and a first driving portion 140 moving the holder 120.

The reflecting member 110 is configured to change a direction of light emissions. In more detail, the reflecting member 110 is provided as a mirror or a prism reflecting light. The reflecting member 110 is fixed to the holder 120. The holder 120 includes a mounting surface (see 123 of FIG. 6) on which the reflecting member 110 is mounted. The mounting surface 123 of the holder 120 may be provided as an inclined surface. For example, the mounting surface 123 is provided as an inclined surface tilted at an angle of 45° to an optical axis (a Z axis) of a plurality of lenses.

The holder 120 including the reflecting member 110 mounted therein is accommodated in the first housing 130, in order to be moved therein. In more detail, the holder 120 is free to rotate with respect to a first axis (an X axis) and a second axis (a Y axis), in the first housing 130. Thus, the reflecting member 110 mounted in the holder 120 is also free to rotate, with respect to the first axis (the X axis) and the second axis (the Y axis). The holder 120 is configured to move with respect to the first housing 130 so that the reflecting member 110 may be rotated, with respect to the first axis (the X axis) and the second axis (the Y axis).

In an embodiment, the first axis (the X axis) and the second axis (the Y axis) refer to axes perpendicular to the optical axis (the Z axis). The first axis (the X axis) and the second axis (the Y axis) may refer to axes perpendicular to each other. In the example, the holder 120 including the reflecting member 110 is configured to be moved when an image or video footage is captured, in order to correct blurriness of an image or shakiness of video footage caused by factors, such as user-introduced shaking.

In more detail, in a case in which movement occurs because of shaking by a user's hand, when an image or video footage is captured, movement is compensated for by providing relative displacement corresponding to the movement to the holder 120. In other words, in the example, in order to implement the OIS function, the plurality of lenses or an image sensor 310 is not directly moved. Instead, the holder 120 including the reflecting member 110 mounted therein is moved, changing the direction of light emissions. Because the holder 120, which is relatively light, is moved to implement the OIS function, power consumption may be minimized.

The driving portion 140 generates driving power so that the holder 120 may be rotated, with respect to two axes. In further detail, the first driving portion 140 includes magnets 141a, 143a, and 145a, and coils 141b, 143b, and 145b, disposed to face magnets 141a, 143a, and 145a. In a case in which power is applied to coils 141b, 143b, and 145b, the holder 120 including magnets 141a, 143a, and 145a mounted therein may be rotated with respect to the first axis (the X axis) and the second axis (the Y axis). The rotation is performed as a result of electromagnetic force between the magnets 141a, 143a, and 145a, and the coils 141b, 143b, and 145b.

The magnets 141a, 143a, and 145a are mounted in the holder 120. For example, a magnet 141a among the magnets 141a, 143a, and 145a is mounted on a lower surface of the holder 120, while the other magnets 143a and 145a are mounted on a side surface of the holder 120. The plurality of coils 141b, 143b, and 145b are mounted in the first housing 130. For example, the coils 141b, 143b, and 145b are mounted in the first housing 130 by a medium of an OIS substrate 161. The coils 141b, 143b, and 145b are disposed in the OIS substrate 161, while the OIS substrate 161 is mounted in the first housing 130.

A reinforced plate 167 is mounted below the OIS substrate 161 to reinforce strength of the OIS substrate 161. In the example, a closed loop control method used to detect a position of the holder 120 and provide notice of the position is used, when the holder 120 is rotated. Thus, position sensors 141c and 143c control a closed loop. The position sensors 141c and 143c are provided as a hall sensor. The position sensors 141c and 143c are disposed on an internal side or an external side of each of coils 141b and 143b. The position sensors 141c and 143c may be mounted on the OIS substrate 161 including each of the coils 141b and 143b.

Also as shown in FIG. 5, a gyro sensor 165 is disposed on the OIS substrate 161. The gyro sensor 165 is used for detecting instances of shakiness, such as shaking by a user's hand. A driver integrated circuit (IC) 163 providing a driving signal to the plurality of coils 141b, 143b, and 145b is also disposed on the OIS substrate 161.

Figure 8:
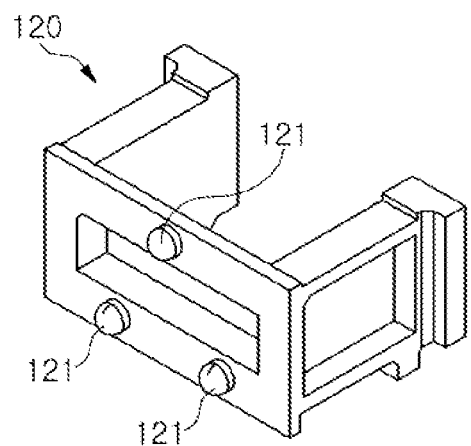
FIG. 8 is a perspective view of a holder of the reflecting module according to an example.
Figure 9:
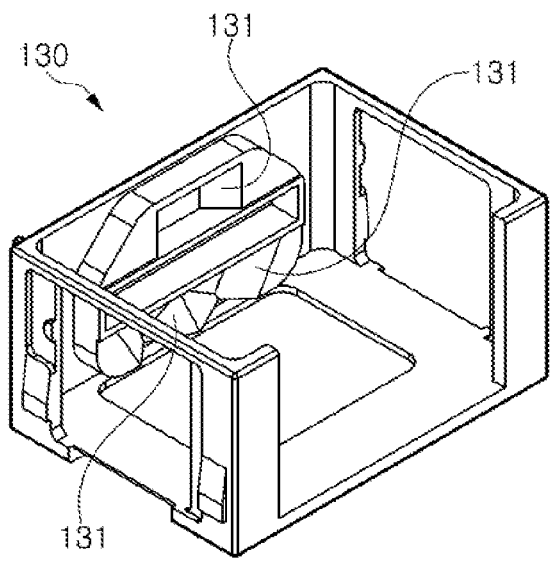
FIG. 9 is a perspective view of a first housing of the reflecting module according to an example.
Figure 10:
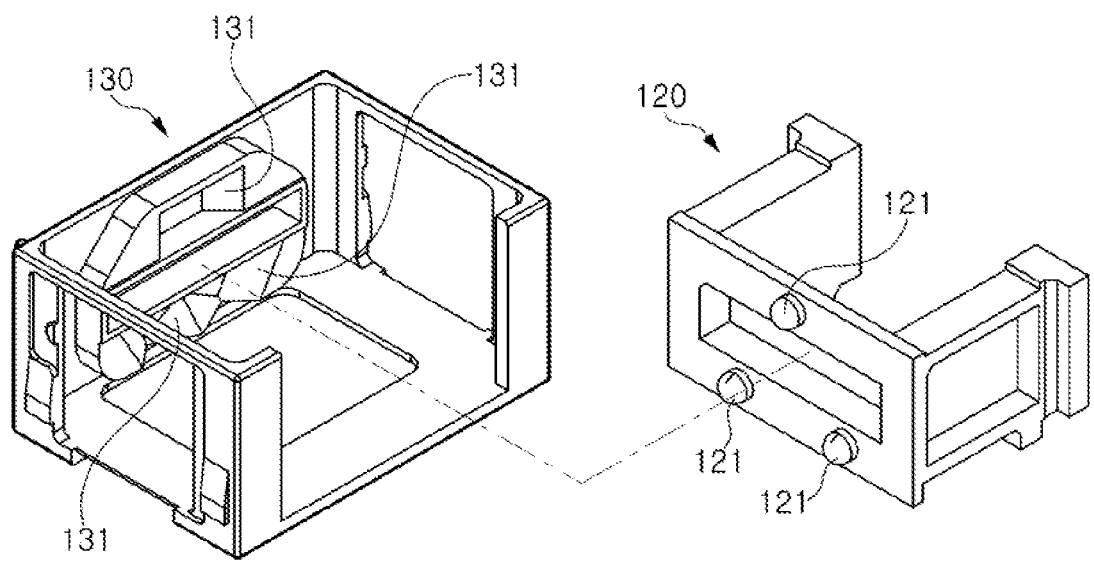
FIG. 10 is a schematic perspective view illustrating a combined structure of the holder and the first housing of the reflecting module according to an example.
Figure 11A:
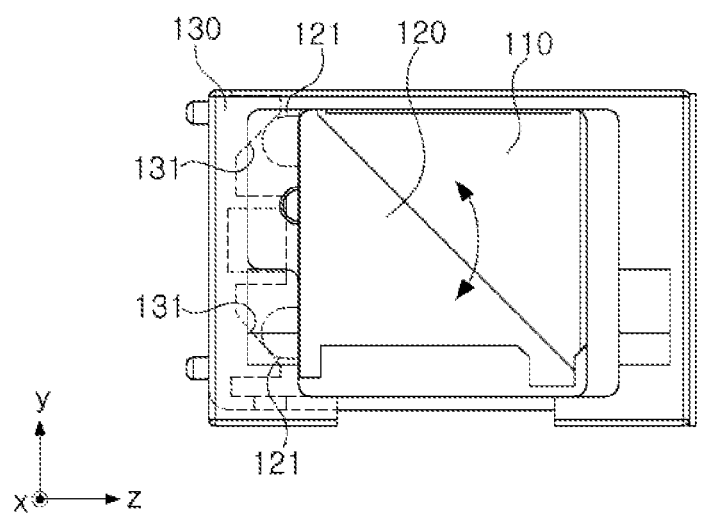
FIGS. 11A to 11O are schematic views illustrating a state in which the holder of the reflecting module is rotated with respect to a first axis according to an example.
Figure 12A:
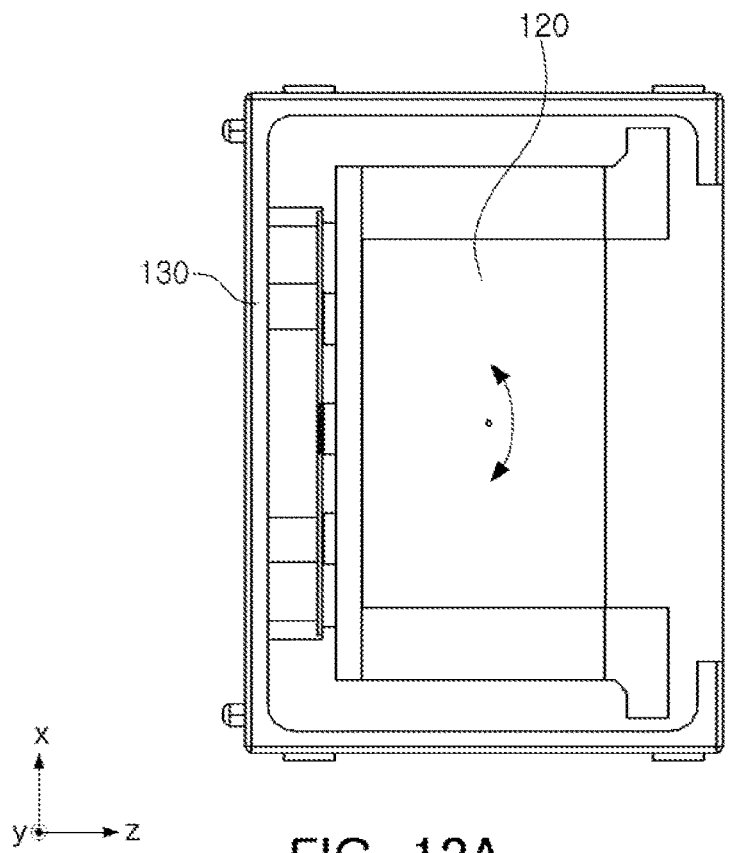
FIGS. 12A to 12C are schematic views illustrating a state in which the holder of the reflecting module is rotated with respect to a second axis according to an example.
Figure 12B:
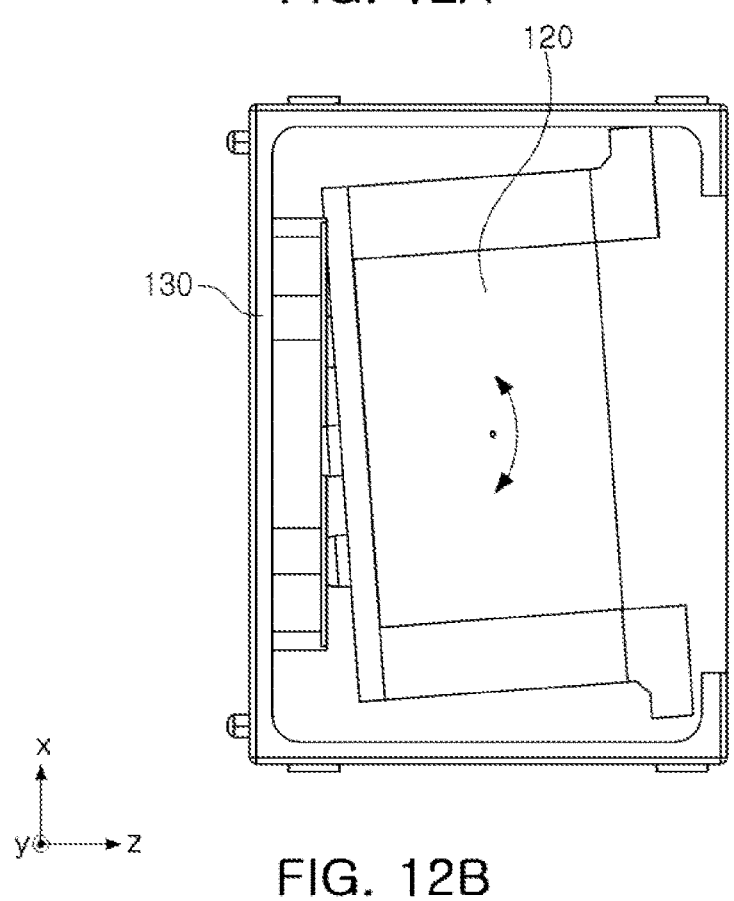
Figure 12C:
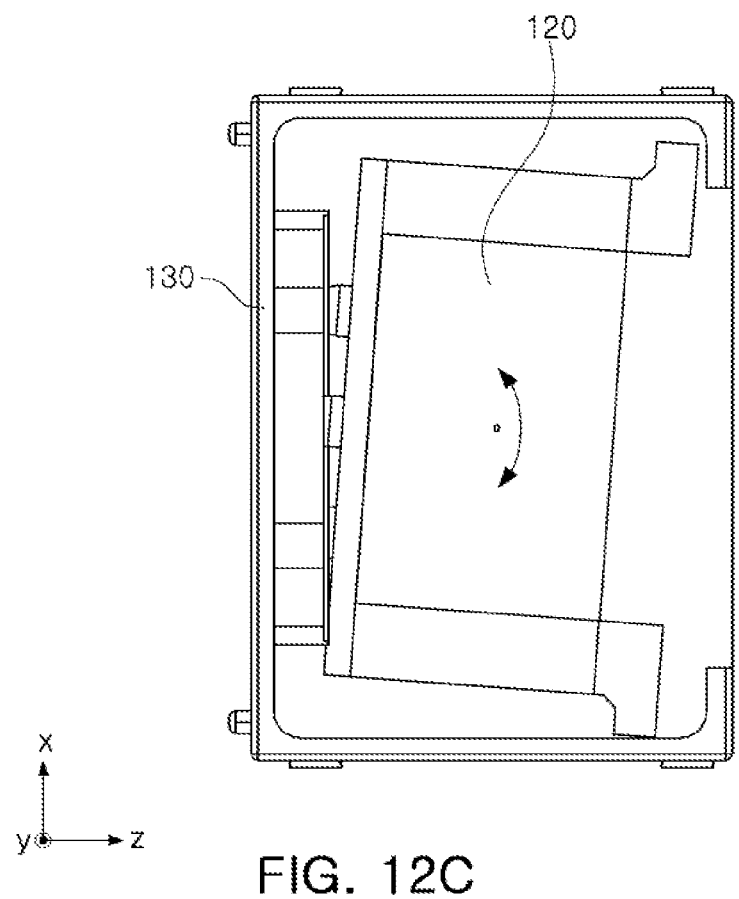

FIG. 8 is a perspective view of a holder of the reflecting module according to an example, FIG. 9 is a perspective view of a first housing of the reflecting module according to an example, and FIG. 10 is a schematic perspective view illustrating a combined structure of the holder and the first housing of the reflecting module according to an example. In addition, FIGS. 11A to 11O are schematic views illustrating a state in which the holder of the reflecting module is rotated with respect to a first axis according to an example, while FIGS. 12A to 12C are schematic views illustrating a state in which the holder of the reflecting module is rotated with respect to a second axis according to an example.

A holder 120 is supported by a first housing 130. As a support structure, a convex portion and a concave portion are disposed on facing surfaces of the holder 120 and the first housing 130. For example, the holder 120 includes support protrusions 121 as a convex portion, while the first housing 130 includes support grooves 131 in contact with the support protrusions 121 as a concave portion. Positions of the support protrusions 121 and the support grooves 131 may be interchangeable.

Each of the support protrusions 121 may have a ball shape or a hemispherical shape. In the example, three support protrusions are disposed to have a triangular shape, but the example is not limited thereto. In the case of a structure in which the holder 120 may be rotated, with respect to two axes, the number of support protrusions or the form of those protrusions may be changed.

Each of the support grooves 131 includes an inclined surface, while the support protrusions 121 are in contact with the inclined surface disposed in the support grooves 131. For example, the plurality of support protrusions 121 are configured to be in point contact with the inclined surface disposed in the support grooves 131.

In an embodiment, in order to maintain a state of contact between the support grooves 131 and the support protrusions 121, the holder 120 is pressed toward the first housing 130. The support grooves 131 are formed to be concave in a direction in which the holder 120 is pressed. The support protrusions 121 are formed to be convex in the direction in which the holder 120 is pressed.

On facing surfaces of the holder 120 and the first housing 130, a first yoke 153 and a magnet 151, which are magnetically attracted to each other, are disposed. For example, the magnet 151 is mounted on a surface in which the support protrusions 121 are formed, among surfaces of the holder 120 (see magnet 151 of FIG. 5). The first yoke 153 is mounted on a surface in which the support grooves 131 are formed, among surfaces of the first housing 130 (see yoke 153 of FIG. 5).

The first yoke 153 is provided as a magnetic material, while mounting positions of the magnet 151 and the first yoke 153 may be interchangeable. In a different example, the magnet 151 may also be mounted in an entirety of the holder 120 and the first housing 130. The first yoke 153 and the magnet 151 are magnetically attractive. Thus, the holder 120 may be rotated, with respect to the first axis (an X axis) and/or the second axis (a Y axis) by driving power of a first driving portion 140 while the holder 120 is in contact with the first housing 130.

Figure 11B:
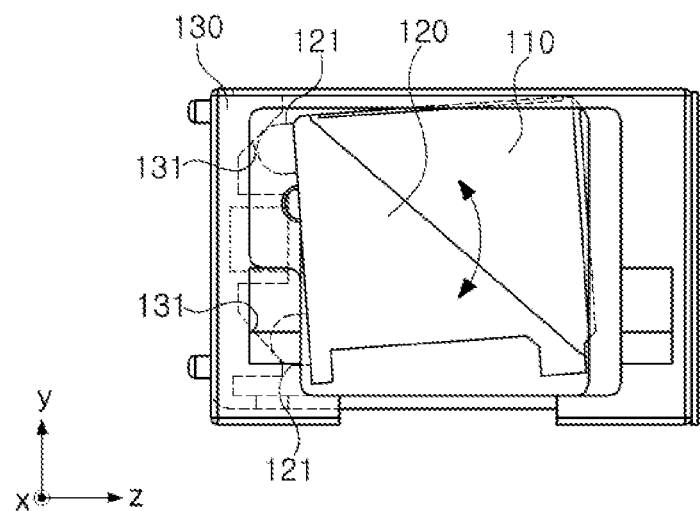
Figure 11C:
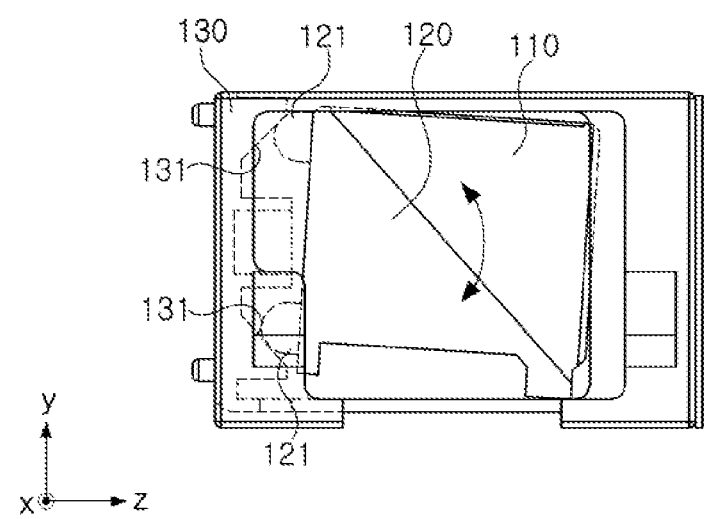

With reference to FIGS. 11A to 11C, in a case in which driving power is generated in a direction of the second axis (the Y axis), the holder 120 is rotated with respect to the first axis (the X axis). In this case, the support protrusions 121 are configured to slide along the inclined surface disposed in the support grooves 131 while the support protrusions 121 are in contact with the support grooves 131.

In a case in which power is not applied to coils 141b, 143b, and 145b of the first driving portion 140, the holder 120 is disposed in a reference position (e.g., a state in which a mounting surface 123 of the holder 120 is tilted at an angle of about 45° to an optical axis (a Z axis) of the lenses). This position results from the magnetic attraction between the first yoke 153 and the magnet 151 (see FIG. 11A).

In a case in which instances of shaking occurs, such as the shaking of a user's hand, the holder 120 may be rotated, with respect to the first axis (the X axis) to correct movement as illustrated in FIGS. 11B and 11C. In an embodiment, driving power is generated in the direction of the second axis (the Y axis) in cases in which power is applied to a coil 141b disposed to face a magnet 141a mounted on a lower surface of the holder 120 among the coils 141b, 143b, and 145b of the first driving portion 140. As a result, the holder 120 is rotated with respect to the first axis (the X axis).

In this case, the support protrusions 121 are configured to slide while the support protrusions 121 are in contact with the support grooves 131. In a case in which the holder 120 is rotated counterclockwise (see FIG. 11B) or clockwise (see FIG. 11C) with respect to the first axis (the X axis), the plurality of support protrusions 121 are configured to slide along the inclined surface disposed in the plurality of support grooves 131.

With reference to FIGS. 12A to 12C, in a case in which driving power is generated in a direction of the first axis (the X axis), the holder 120 is rotated with respect to the second axis (the Y axis). In this case, the support protrusions 121 are configured to slide along the inclined surface disposed in the support grooves 131 while the support protrusions 121 are in contact with the support grooves 131.

In a case in which power is not applied to coils 141b, 143b, and 145b of the first driving portion 140, the holder 120 is disposed in the reference position (e.g., a state in which the mounting surface 123 of the holder 120 is tilted at an angle of about 45° to the optical axis (the Z axis) of the plurality of lenses). This is a result of the magnetic attraction between the first yoke 153 and the magnet 151 (see FIG. 12A).

In a case in which shaking of a user's hand occurs, the holder 120 may be rotated with respect to the second axis (the Y axis) to correct movement as illustrated in FIGS. 12B and 12C. In an embodiment, in cases in which power is applied to coils 143b and 145b disposed to face magnets 143a and 145a mounted on a side surface of the holder 120 among the plurality of coils 141b, 143b, and 145b of the first driving portion 140, driving power is generated in the direction of the first axis (the X axis). Accordingly, the holder 120 is rotated with respect to the second axis (the Y axis).

In this case, the support protrusions 121 are configured to slide while the support protrusions 121 are in contact with the support grooves 131. In a case in which the holder 120 is rotated counterclockwise (see FIG. 12B) or clockwise (see FIG. 12C) with respect to the second axis (the Y axis), the support protrusions 121 are configured to slide along the inclined surface disposed in the support grooves 131. In order to reduce friction between the support protrusions 121 and the support grooves 131, a lubricant may be provided between the support protrusions 121 and the support grooves 131.

Figure 13:
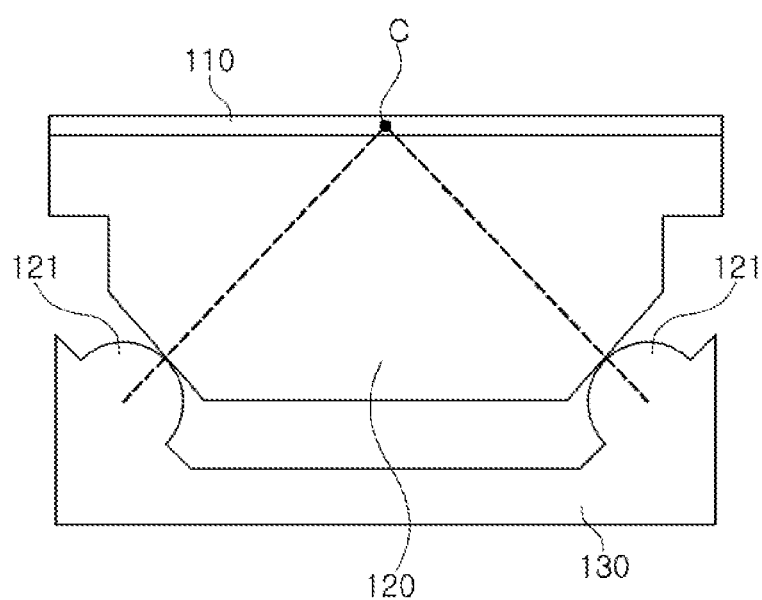
FIG. 13 is a conceptual view illustrating a rotational axis of the reflecting member according to an example.

FIG. 13 is a conceptual view illustrating a rotational axis of the reflecting member according to an example. FIG. 13 illustrates a form in which positions of support protrusions 121 and support grooves 131 described above are changed inversely for the sake of convenience of explanation. FIG. 13 schematically illustrates forms of a holder 120, a first housing 130, and a reflecting member 110. With reference to FIG. 13, in a reflecting module 100 according to an example, a center point C of the reflecting member 110 may be provided as a rotational axis. Thus, because the reflecting member 110 is rotated with respect to the center point C of the reflecting member 110, the center point C of the reflecting member 110 is configured not to be moved when the reflecting member 110 is rotated with respect to a first axis (an X axis) and/or a second axis (a Y axis).

In a case in which the center point C of the reflecting member 110 does not match the rotational axis, the reflecting member 110 is rotated with respect to the rotational axis. Thus, whenever the reflecting member 110 is rotated, the center point C of the reflecting member 110 is also moved. In other words, an amount of movement of the reflecting member 110 is increased, thereby causing a limitation in reducing a total size of the reflecting module 100 including the reflecting member 110 mounted therein.

However, in the example, because the center point C of the reflecting member 110 is provided as the rotational axis, the center point C of the reflecting member 110 is not moved when the reflecting member 110 is rotated. Thus, the total size of the reflecting module 100 including the reflecting member 110 mounted therein may be minimized.

Figure 14:
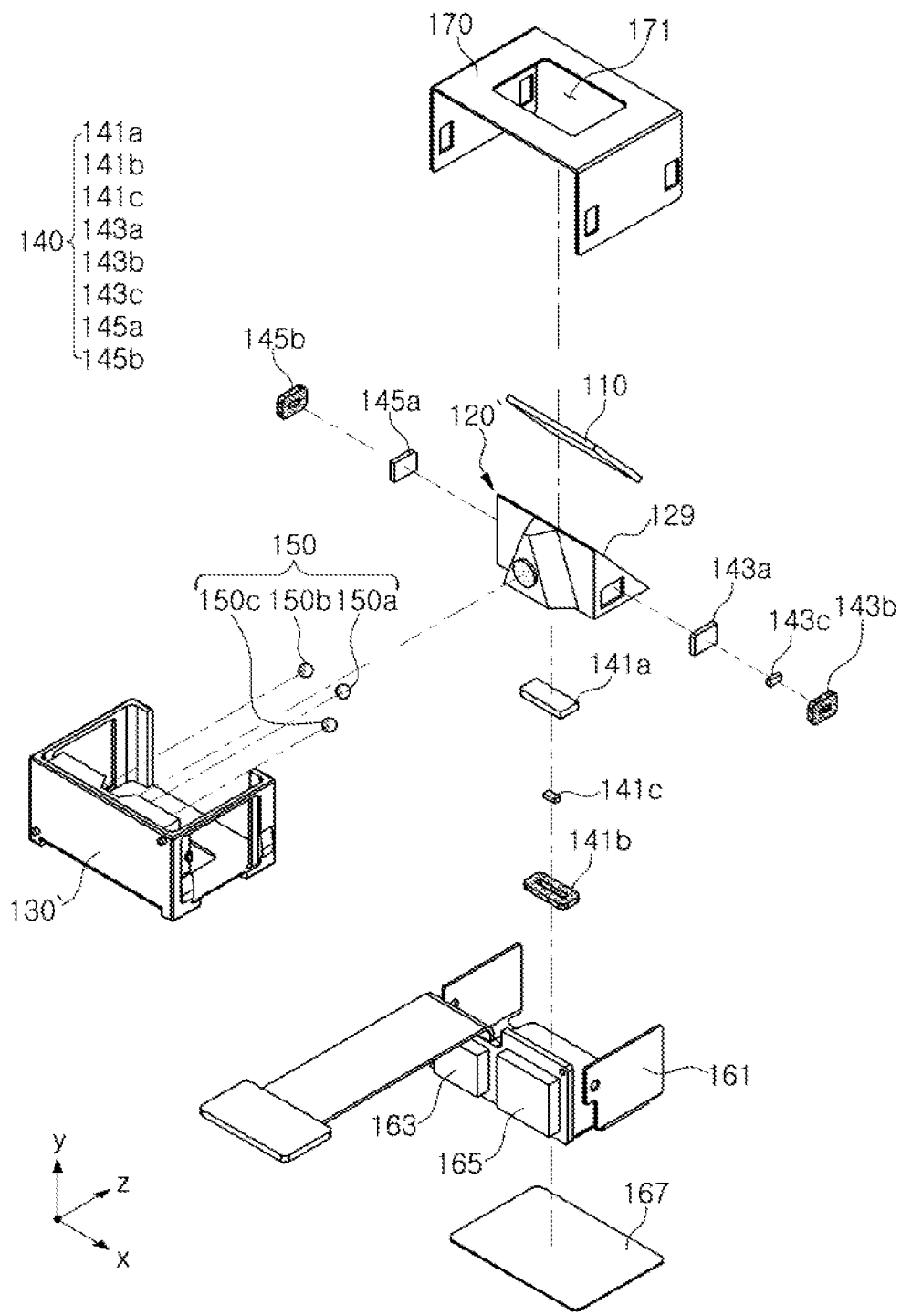
FIG. 14 is an exploded perspective view of the reflecting module according to an example.

FIG. 14 is an exploded perspective view of the reflecting module according to an example. With reference to FIG. 14, a reflecting module 100 includes a reflecting member 110, a holder 120' including the reflecting member 110 mounted therein, a first housing 130' supporting the holder 120', and a first driving portion 140 generating driving power to move the holder 120'.

The reflecting member 110 is configured to change a direction of light emissions. For example, the reflecting member 110 is provided as a mirror or a prism reflecting light. The reflecting member 110 is fixed to the holder 120'. The holder 120' includes a mounting surface 129 on which the reflecting member 110 is mounted. The mounting surface 129 of the holder 120' may include an inclined surface. For example, the mounting surface 129 is an inclined surface tilted at an angle of about 45° to an optical axis (a Z axis) of a plurality of lenses.

The holder 120' including the reflecting member 110 mounted therein is accommodated in the first housing 130', in order to move therein. For example, the holder 120' may be rotated with respect to a first axis (an X axis) and a second axis (a Y axis) in the first housing 130'. Here, the first axis (the X axis) and the second axis (the Y axis) may refer to an axis perpendicular to the optical axis (the Z axis). The first axis (the X axis) and the second axis (the Y axis) may refer to axes perpendicular to each other.

In the example, in order to correct blurriness of an image or shakiness of video footage caused by the shaking of a user's hand or the like, the holder 120' including the reflecting member 110 mounted therein is configured to be moved when an image or video footage is captured. In more detail, in a case in which a user's hand shakes, movement is compensated for by providing relative displacement corresponding to the movement of the holder 120' when an image or video footage is taken. In other words, in order to implement the OIS function in the example, the plurality of lenses or an image sensor 310 is not directly moved, but the holder 120' (including the reflecting member 110 mounted therein) is moved, changing the direction of light emissions. Thus, because the holder 120' that is relatively light in weight may be moved to implement the OIS function, power consumption may be minimized.

The driving portion 140 generates driving power so that the holder 120' may be rotated with respect to two axes. In further detail, the first driving portion 140 includes magnets 141a, 143a, and 145a, and coils 141b, 143b, and 145b, disposed to face the plurality of magnets 141a, 143a, and 145a. In a case in which power is applied to coils 141b, 143b, and 145b, the holder 120' (including the plurality of magnets 141a, 143a, and 145a mounted therein) may be rotated with respect to the first axis (the X axis) and the second axis (the Y axis). The rotation is enabled by electromagnetic force between the magnets 141a, 143a, and 145a, and the coils 141b, 143b, and 145b.

The magnets 141a, 143a, and 145a are mounted in the holder 120'. For example, a magnet 141a among the magnets 141a, 143a, and 145a is mounted on a lower surface of the holder 120', while the other magnets 143a and 145a are mounted on a side surface of the holder 120'. The coils 141b, 143b, and 145b are mounted in the first housing 130'. For example, the plurality of coils 141b, 143b, and 145b are mounted in the first housing 130' by a medium of an OIS substrate 161. The coils 141b, 143b, and 145b are mounted in the OIS substrate 161, while the OIS substrate 161 is mounted in the first housing 130'.

A reinforced plate 167 is mounted below the OIS substrate 161 to reinforce strength of the OIS substrate 161. In the example, a closed loop control method is performed to detect a position of the holder 120' and provide notice of the position, when the holder 120' is rotated. Thus, position sensors 141c and 143c control a closed loop. The position sensors 141c and 143c are provided as a hall sensor. The position sensors 141c and 143c are disposed on an internal side or an external side of each of coils 141b and 143b. The position sensors 141c and 143c are mounted on the OIS substrate 161, including each of the coils 141b and 143b mounted therein.

A gyro sensor 165 is disposed in the OIS substrate 161, which is configured to detect instances of shaking, such as shaking of a user's hand. A driver integrated circuit (IC) 163 providing a driving signal to the coils 141b, 143b, and 145b may also be disposed in the OIS substrate 161.

Figure 15A:
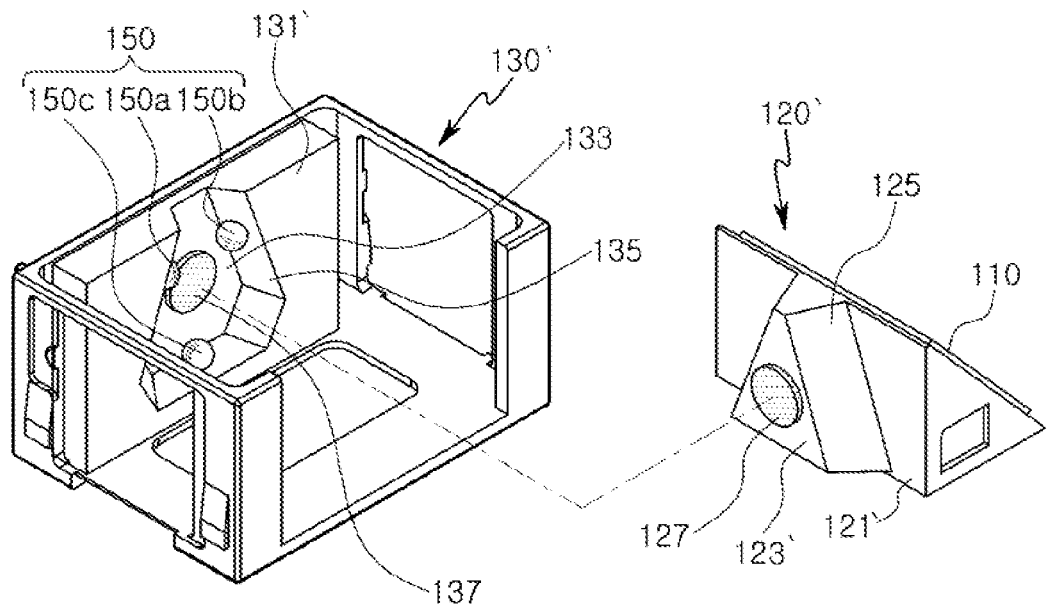
FIGS. 15A to 15C are schematic perspective views illustrating a combined structure of the holder and the first housing of the reflecting module according to an example.
Figure 15B:
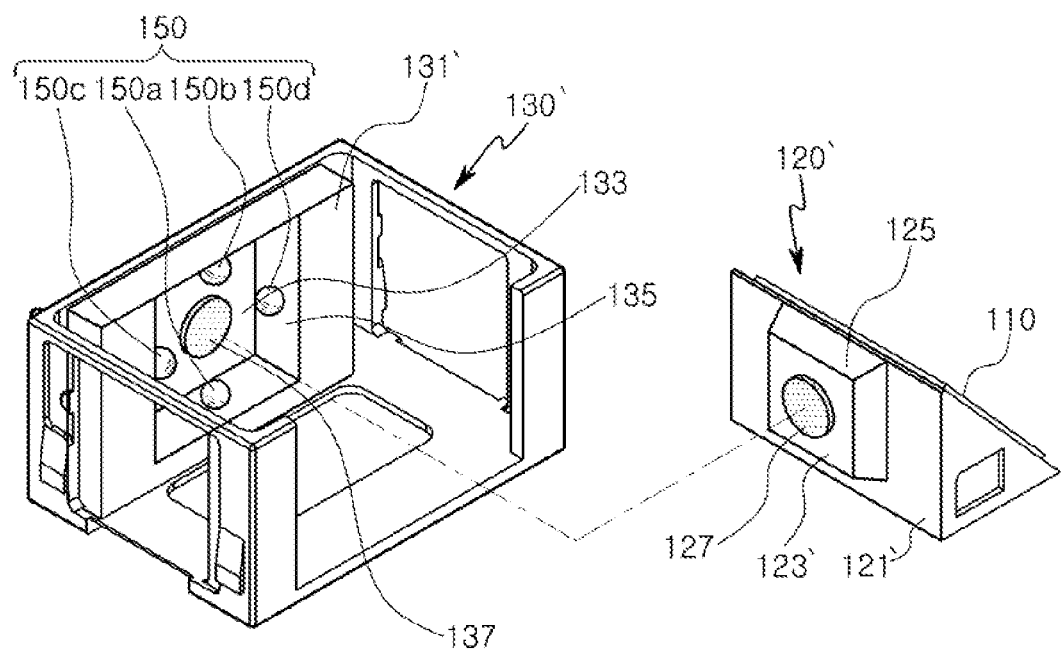
Figure 15C:
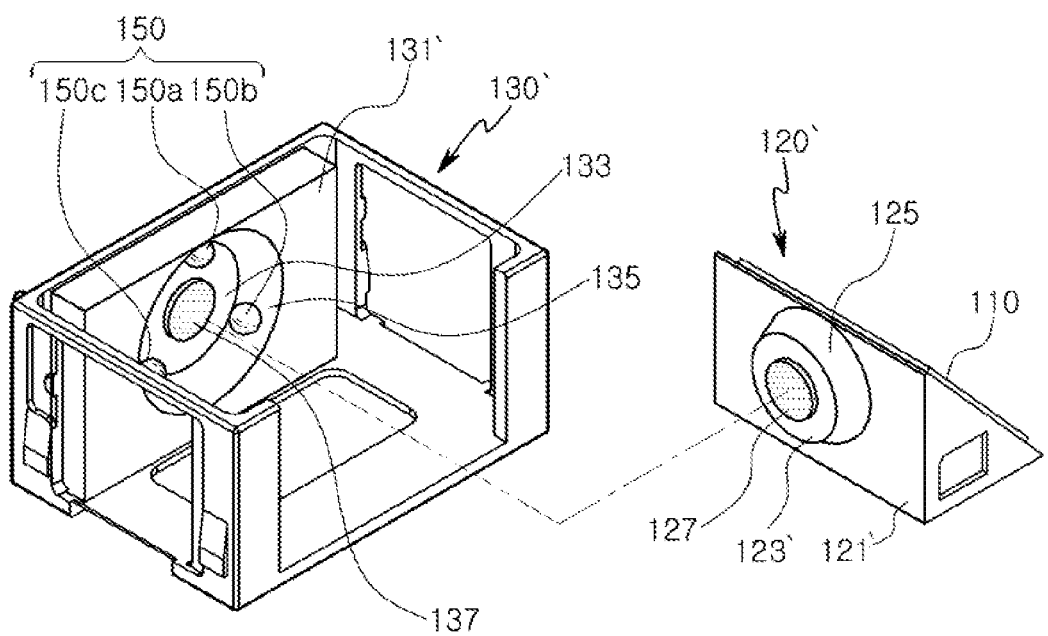

FIGS. 15A to 15C are schematic perspective views illustrating a combined structure of a holder and a first housing of a reflecting module according to an example. With reference to FIGS. 15A to 15C, a holder 120' is accommodated in a first housing 130' and may be rotated. A convex portion 123' is disposed on a surface 121' of the holder 120' facing a surface 131' of the first housing 130', while a concave portion 133 is disposed on a surface 131' of the first housing 130'. Conversely, a concave portion is disposed on the surface 121' of the holder 120', while a convex portion is disposed on the surface 131' of the first housing 130'.

In this case, the convex portion 123' and the concave portion 133 may be formed to have a polygonal shape or a circular shape. In examples, the convex portion 123' and the concave portion 133 are formed to have a triangular shape (FIG. 15A), a rectangular shape (FIG. 15B), or a circular shape (FIG. 15C), but are not limited thereto. In a case in which the convex portion 123' and the concave portion 133 have a structure in which the holder 120' may be rotated with respect to a second axis, forms of the convex portion 123' and the concave portion 133 may be changed.

A portion of the convex portion 123' of the holder 120' is configured to be inserted into the concave portion 133 of the first housing 130'. The convex portion 123' and the concave portion 133 are disposed to be spaced apart from each other. In other words, the convex portion 123' and the concave portion 133 are configured to be in a state of non-contact with each other.

In an embodiment, in order to allow the convex portion 123' and the concave portion 133 to be in a state of non-contact with each other, a support portion 150 is disposed between the convex portion 123' and the concave portion 133. The support portion 150 may include ball members 150a, 150b, and 150c (150a, 150b, 150c, and 150d in an example of FIG. 15B). The ball members 150a, 150b, and 150c may have a ball shape or a hemispherical shape.

The convex portion 123' and the concave portion 133 include inclined surfaces 125 and 135. While a portion of the convex portion 123' is inserted into the concave portion 133, an inclined surface 125 of the convex portion 123' is disposed to be parallel with an inclined surface 135 of the concave portion 133.

The support portion 150 is interposed between the inclined surface 125 of the convex portion 123' and the inclined surface 135 of the concave portion 133. The support portion 150 is in contact with each of the inclined surface 125 of the convex portion 123' and the inclined surface 135 of the concave portion 133.

In further detail, side surfaces of the convex portion 123' and the concave portion 133 include inclined surfaces 125 and 135, while the support portion 150 is disposed to be fixed to the inclined surfaces 125 and 135 of the convex portion 123' and the concave portion 133. Thus, in a case in which a portion of the convex portion 123' of the holder 120' is inserted into the concave portion 133 of the first housing 130', the support portion 150 is in contact with each of the inclined surface 125 of the convex portion 123' and the inclined surface 135 of the concave portion 133. The convex portion 123' and the concave portion 133 are in a state of non-contact with each other due to the support portion 150.

In order to maintain a state in which the support portion 150 is in contact with each of the inclined surface 125 of the convex portion 123' and the inclined surface 135 of the concave portion 133, the holder 120' is pressed toward the first housing 130'. To this end, a magnet 127 is mounted on the convex portion 123' of the holder 120', while a first yoke 137 is mounted on the concave portion 133 of the first housing 130'.

The first yoke 137 may be formed of a magnetic material, while mounting positions of the magnet 127 and the first yoke 137 may be interchangeable. In a different example, the magnet 127 is also mounted in an entirety of the convex portion 123' and the concave portion 133.

There is a magnetic attraction between the first yoke 137 and the magnet 127. Thus, the support portion 150 maintains a state in which the support portion 150 is in contact with each of the inclined surface 125 of the convex portion 123' and the inclined surface 135 of the concave portion 133. The holder 120' may be rotated with respect to a first axis (an X axis) and/or a second axis (a Y axis) in the first housing 130' by driving power of a first driving portion 140 while the holder 120' is supported by the support portion 150.

Figure 16A:
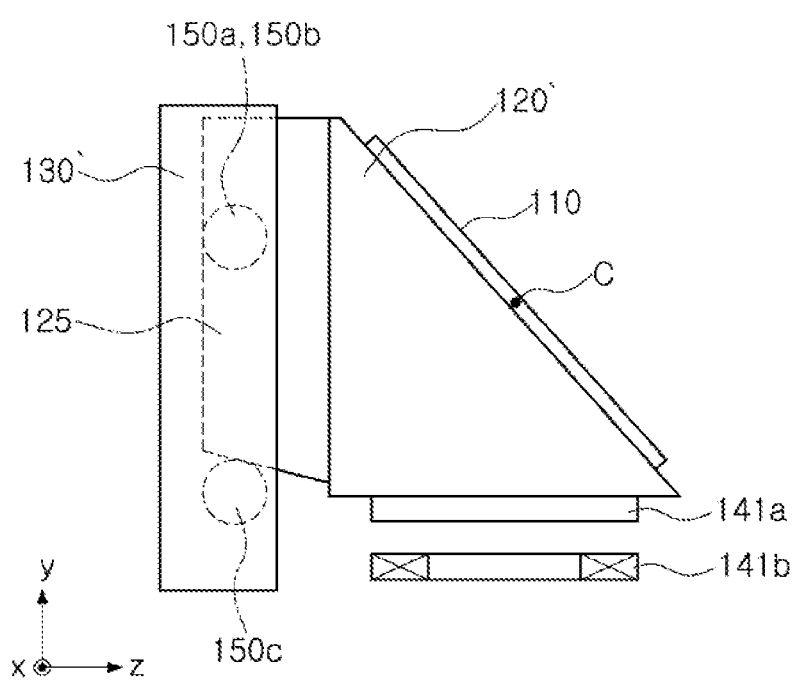
FIG. 16A is a schematic side view of the reflecting module according to an example.
Figure 16B:
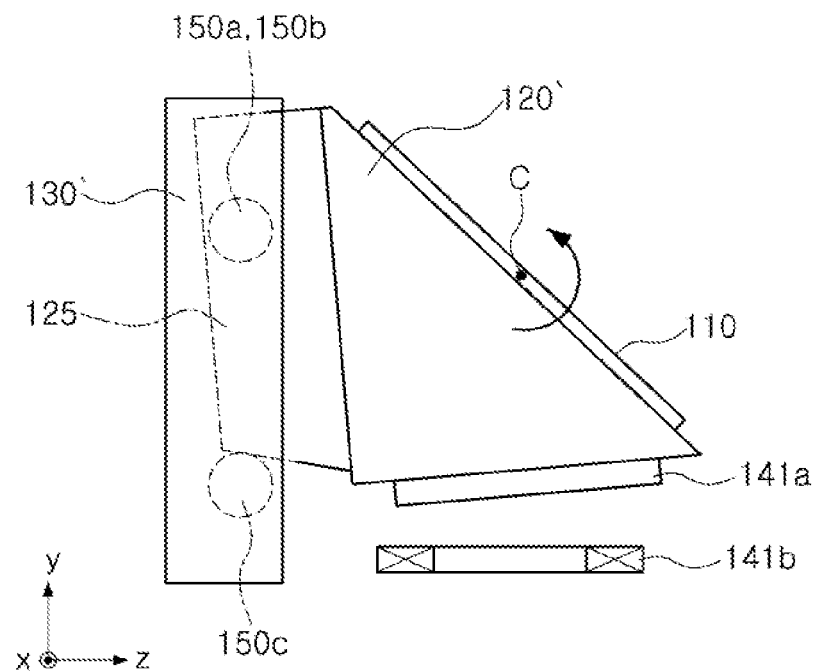
FIGS. 16B to 16C are schematic views illustrating a state in which the holder of the reflecting module is rotated with respect to a first axis according to an example.
Figure 16C:
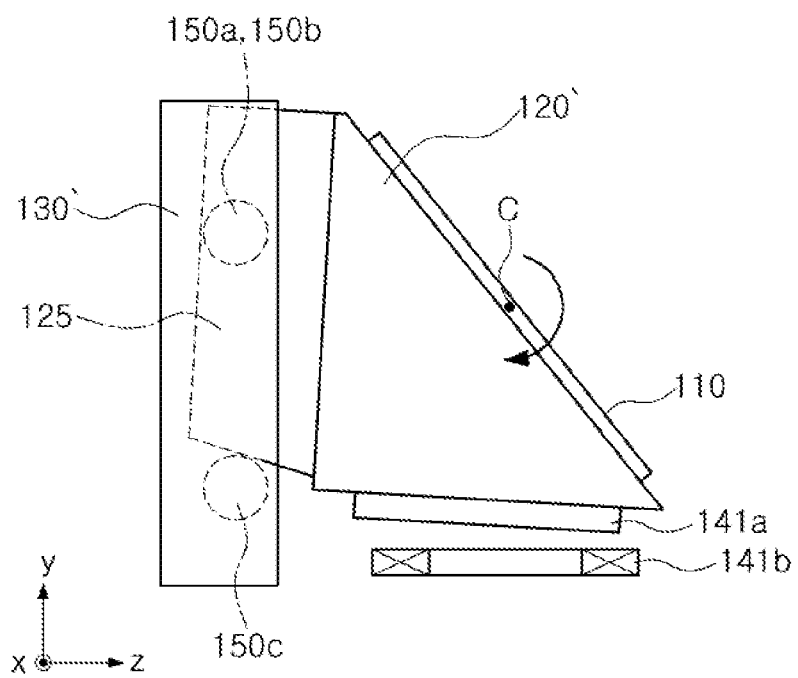
Figure 17A:
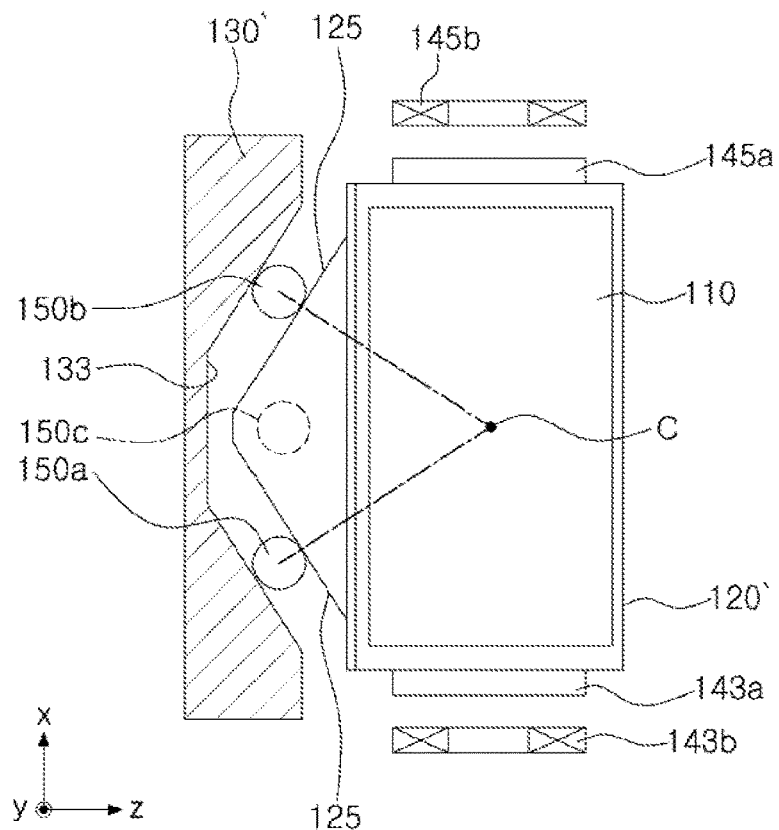
FIG. 17A is a schematic top view of the reflecting module according to an example.
Figure 17B:
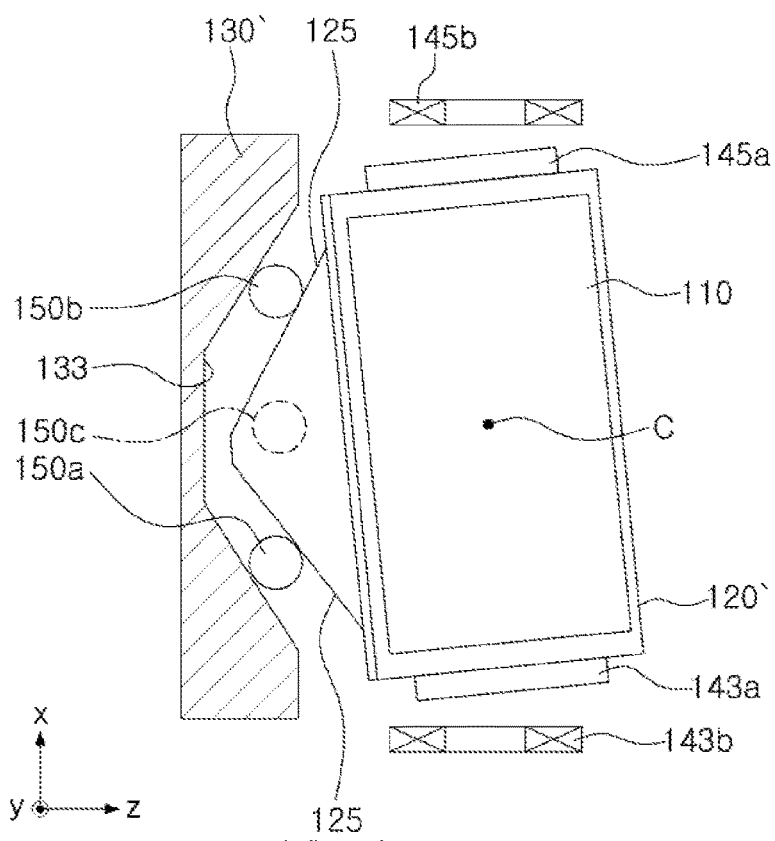
FIGS. 17B and 17C are schematic views illustrating a state in which the holder of the reflecting module is rotated with respect to a second axis according to an example.
Figure 17C:
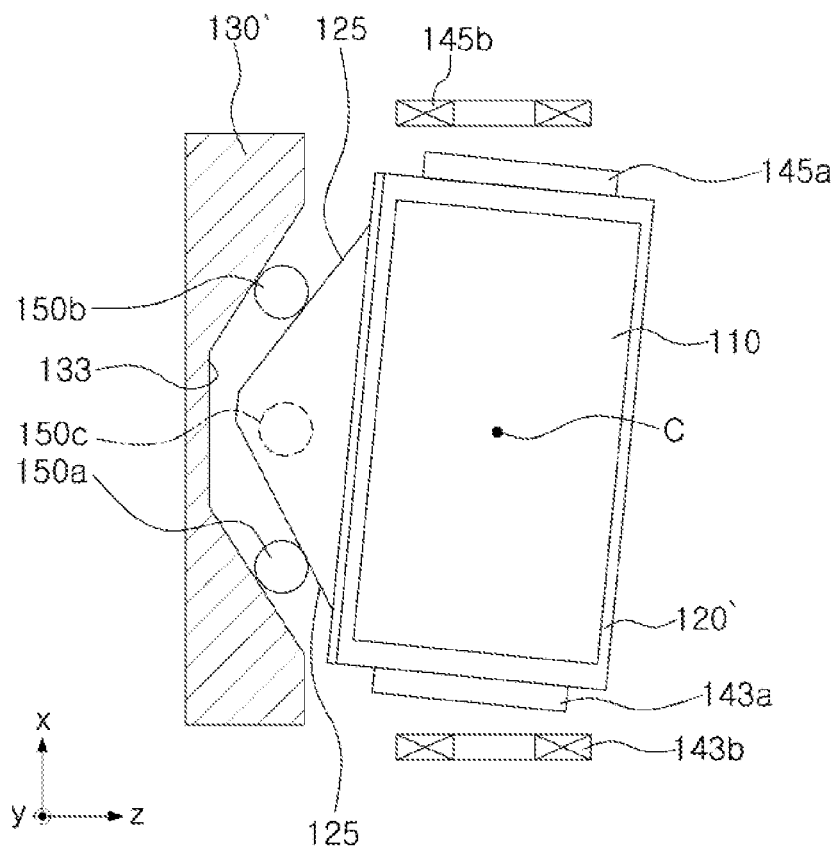

FIG. 16A is a schematic side view of a reflecting module according to an example, while FIGS. 16B to 16C are schematic views illustrating a state in which the holder of the reflecting module is rotated with respect to a first axis according to an example. In addition, FIG. 17A is a schematic top view of the reflecting module according to an example, while FIGS. 17B and 17C are schematic views illustrating a state in which the holder of the reflecting module is rotated with respect to a second axis according to examples. With reference to FIGS. 16A to 16C, a state in which a holder 120' of a reflecting module 100 according to an example is rotated with respect to a first axis (an X axis) will be described.

In a case in which power is not applied to coils 141b, 143b, and 145b of a first driving portion 140, the holder 120' may be disposed in a reference position (e.g., a state in which a mounting surface 129 of the holder 120' is inclined at an angle of about 45° to an optical axis (a Z axis) of a plurality of lenses). This is a result of magnetic attraction between a first yoke 137 disposed in a concave portion 133 and a magnet 127 disposed in a convex portion 123' (see FIG. 16A). In a case of shaking, the holder 120' may be rotated with respect to the first axis (the X axis) to correct movement as illustrated in FIGS. 16B and 16C.

In further detail, in a case in which power is applied to a coil 141b disposed to face a magnet 141a mounted on a lower surface of the holder 120' among the plurality of coils 141b, 143b, and 145b of the first driving portion 140, driving power is generated in the direction of the second axis (the Y axis). Thus, the holder 120' is rotated with respect to the first axis (the X axis). In this case, an inclined surface 125 of the convex portion 123' is configured to slide while a support portion 150 is in contact therewith. In a case in which the holder 120' is rotated counterclockwise (see FIG. 16B) or clockwise (see FIG. 16C) with respect to the first axis (the X axis), the inclined surface 125 of the convex portion 123' slides along a surface of the support portion 150.

Subsequently, with reference to FIGS. 17A to 17C, a state is described in which the holder 120' of the reflecting module 100 according to an example is rotated with respect to the second axis (the Y axis). In a case in which power is not applied to coils 141b, 143b, and 145b of the first driving portion 140, the holder 120' is disposed in the reference position (e.g., a state in which the mounting surface 129 of the holder 120' is inclined at an angle of about 45° to the optical axis (the Z axis) of the plurality of lenses). This is a result of magnetic attraction between the first yoke 137 disposed in the concave portion 133 and the magnet 127 disposed in the convex portion 123' (see FIG. 17A).

In a case in which shaking occurs (e.g., due to shaking of a user's hand), the holder 120' may be rotated with respect to the second axis (the Y axis) to correct movement as illustrated in FIGS. 17B and 17C. In more detail, in a case in which power is applied to coils 143b and 145b disposed to face magnets 143a and 145a mounted on a side surface of the holder 120' among the plurality of coils 141b, 143b, and 145b of the first driving portion 140, driving power is generated in the direction of the first axis (the X axis). As a result, the holder 120' is rotated with respect to the second axis (the Y axis). In this case, the inclined surface 125 of the convex portion 123' is configured to slide while the support portion 150 is in contact therewith.

In a case in which the holder 120' is rotated counterclockwise (see FIG. 17B) or clockwise (see FIG. 17C) with respect to the second axis (the Y axis), the inclined surface 125 of the convex portion 123' is configured to slide along the surface of the support portion 150. In order to reduce frictional force between the inclined surface 125 of the convex portion 123' and the support portion 150, a lubricant is provided between the inclined surface 125 of the convex portion 123' and the support portion 150.

In the same manner as the example described with reference to FIG. 13, in another example, a center point C of a reflecting member 110 may be provided as a rotational axis. Thus, because the reflecting member 110 is rotated with respect to the center point C of the reflecting member 110, the center point C of the reflecting member 110 is configured not to be moved when the reflecting member 110 is rotated with respect to the first axis (the X axis) and/or the second axis (the Y axis).

With reference to FIG. 17A, the center point C of the reflecting member 110 provided as the rotational axis is formed in a meeting position in which extended lines of conceptual lines connecting a contact point between a plurality of ball members 150a, 150b, and 150c and the inclined surface 125 of the convex portion 123' meet a contact point between the plurality of ball members 150a, 150b, and 150c and the inclined surface 135 of the concave portion 133.

In a case in which the center point C of the reflecting member 110 does not match the rotational axis, the reflecting member 110 is rotated with respect to the rotational axis, rather than with respect to the center point C of the reflecting member 110. Thus, whenever the reflecting member 110 is rotated, the center point C of the reflecting member 110 is also moved. In other words, an amount of movement of the reflecting member 110 is increased, thereby causing a limitation in reducing a total size of the reflecting module 100 including the reflecting member 110 mounted therein.

However, in the example, because the center point C of the reflecting member 110 is provided as the rotational axis, the center point C of the reflecting member 110 is not moved when the reflecting member 110 is rotated. Thus, the total size of the reflecting module 100 including the reflecting member 110 mounted therein may be minimized.

Figure 18:
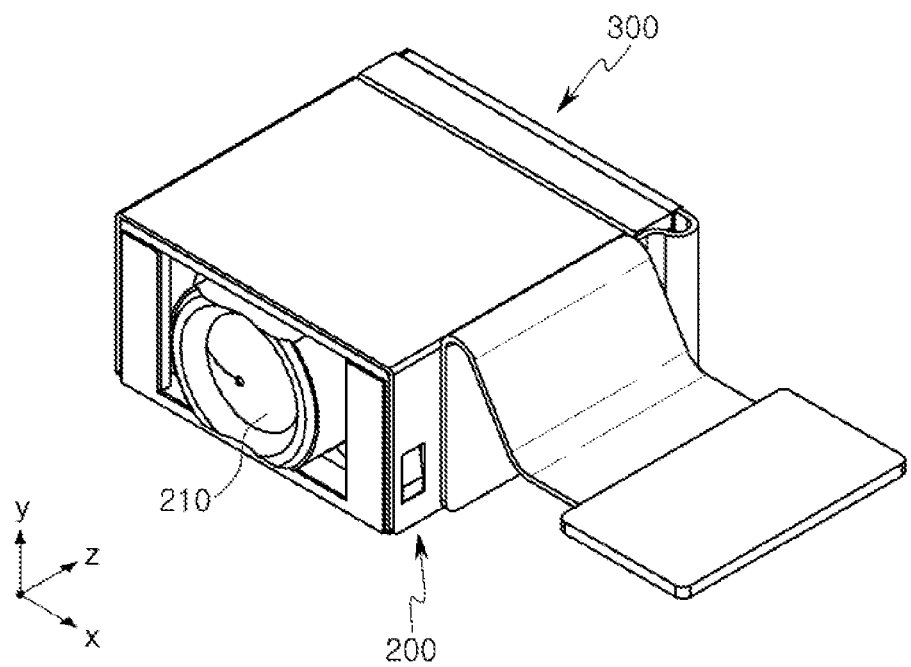
FIG. 18 is a perspective view of a lens module and an image sensor module, included in a camera module, according to an example.
Figure 19:
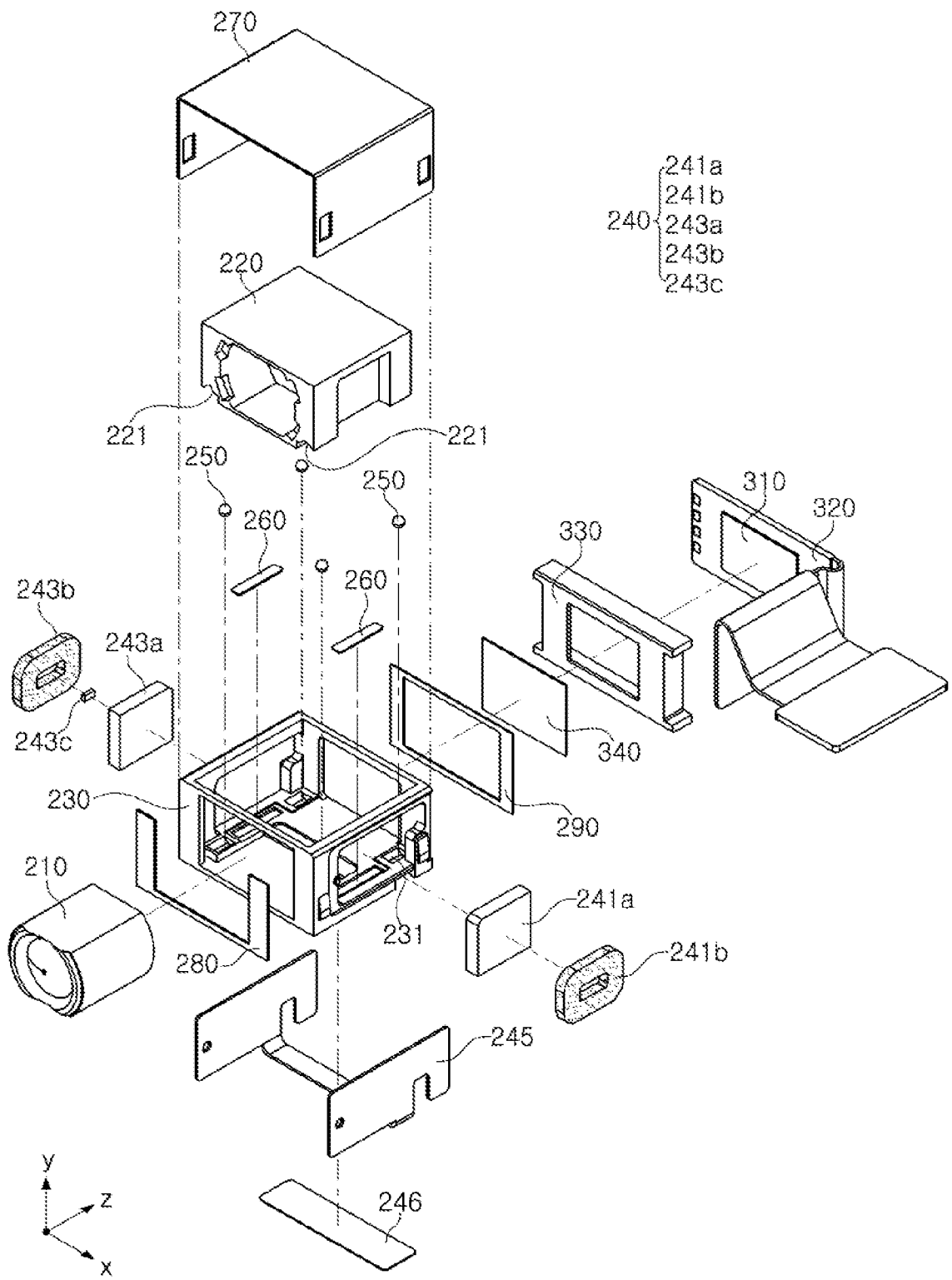
FIG. 19 is an exploded perspective view of the lens module and the image sensor module, included in a camera module, according to an example.
Figure 20:
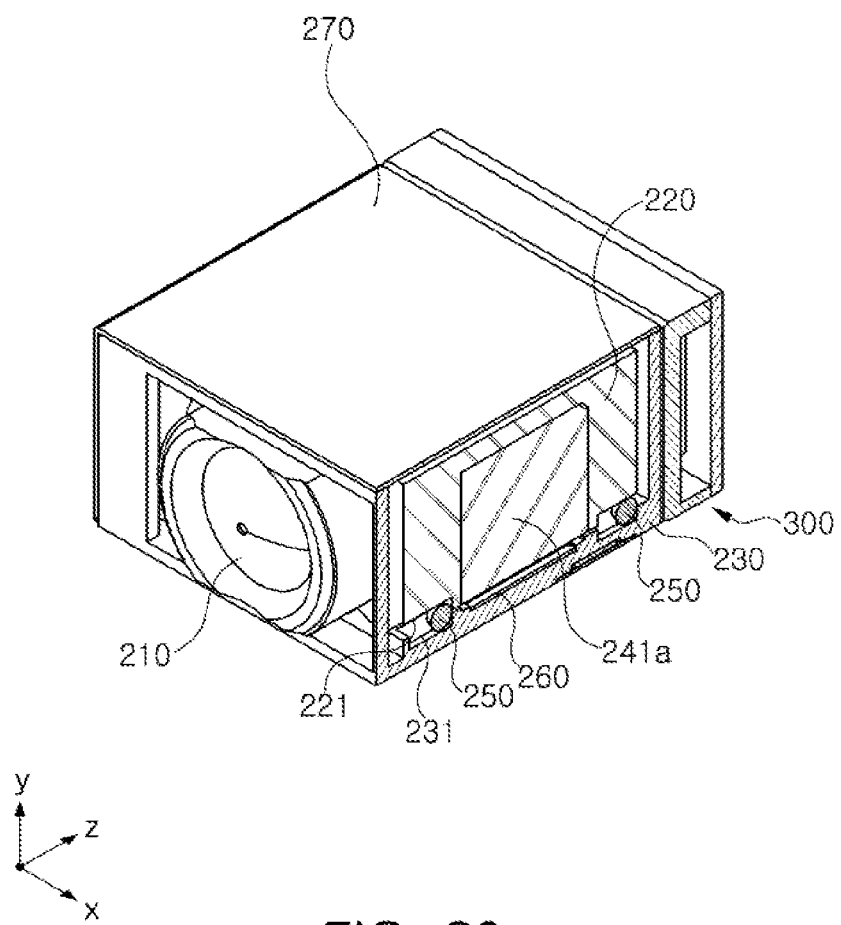
FIG. 20 is a partially cutaway perspective view of the lens module and the image sensor module included in a camera module according to an example.

FIG. 18 is a perspective view of a lens module and an image sensor module, included in a camera module according to an example, while FIG. 19 is an exploded perspective view of the lens module and the image sensor module, included in the camera module according to an example. In addition, FIG. 20 is a partially cutaway perspective view of the lens module and the image sensor module included in the camera module according to an example. With reference to FIGS. 18 to 20, a lens module 200 includes a lens barrel 210 including lenses, a carrier 220 including the lens barrel 210 mounted therein, a second housing 230 accommodating the lens barrel 210 and the carrier 220, a cover 270, and a second driving portion 240 moving the carrier 220.

An image sensor module 300 includes an image sensor 310. A printed circuit board 320 including the image sensor 310 is mounted in the sensor module 300. The image sensor module 300 also includes a sensor housing 330 in which a window is formed to allow light to be received in the image sensor 310 and on which the printed circuit board 320 is mounted. The image sensor module 300 further includes an infrared light cut off filter 340 mounted in the sensor housing 330.

The lens barrel 210 accommodates the plurality of lenses capturing a subject. The lenses are mounted in the lens barrel 210 in a direction of an optical axis. An external shape of the lens barrel 210 may generally have a cylindrical shape, while a surface of a cylinder and an opposing surface thereof may have a planar shape (see FIG. 12). Thus, a distance of the lens barrel 210 in an X-axis direction may be shorter than that in a Y-axis direction. In addition, an internal shape of the lens barrel 210 may correspond to the external shape thereof.

In an embodiment, a shape of the lenses accommodated in the lens barrel 210 may also correspond to the internal shape of the lens barrel 210. In other words, the lenses may generally have a circular shape, but may have a shape, a portion of which is cut away. Thus, a distance (a diameter) of each of the lens in the X-axis direction may be shorter than that in the Y-axis direction. Since the Y-axis direction is provided as a thickness direction of a portable electronic device 1000, minimization of a thickness of the portable electronic device 1000 is possible in the example.

Light having an emission direction changed by a reflecting module 100 is refracted while travelling through the lenses. The optical axis (a Z axis) of the lenses is formed to be perpendicular to a thickness direction (the Y axis direction) of the lens module 100. The lens barrel 210 is inserted into the carrier 220 and fixed thereto, while the carrier 220 is configured to be moved in an optical axis (the Z axis) direction together with the lens barrel 210 to implement an AF function. For example, the carrier 220 is configured to move in a direction in which light having an emission direction changed by the reflecting module 100 travels through the lenses (including the opposite direction).

The second driving portion 240 generates driving power to move the carrier 220 in the optical axis (the Z axis) direction. In other words, the second driving portion 240 moves the carrier 220 in order to change a distance between the carrier 220 and the reflecting module 100. In further detail, the second driving portion 240 includes magnets 241*a* and 243*a* and includes coils 241*b* and 243*b* disposed to face the magnets 241*a* and 243*a*. In a case in which power is applied to the coils 241*b* and 243*b*, the carrier 220 (including the magnets 241*a* and 243*a* mounted therein) are moved in the optical axis (the Z axis) direction by electromagnetic force between the magnets 241*a* and 243*a* and the coils 241*b* and 243*b*.

The magnets 241*a* and 243*a* are mounted in the carrier 220. In greater detail, the magnets 241*a* and 243*a* are mounted on a side surface of the carrier 220. The coils 241*b* and 243*b* are mounted in the second housing 230. For example, the coils 241*b* and 243*b* are mounted in the second housing 230 by a medium of an AF substrate 245. The coils 241*b* and 243*b* are mounted in the AF substrate 245, while the AF substrate 245 is mounted in the second housing 230. A reinforced plate 246 is mounted below the AF substrate 245 to reinforce strength of the AF substrate 245.

In the example, a closed loop control method is performed to detect a position of the carrier 220 and provide notice of the position, when the carrier 220 is moved. Thus, a position sensor 243*c* is needed to control a closed loop. The position sensor 243*c* may be provided as a hall sensor. The position sensor 243*c* is disposed on an internal side or an external side of a coil 243*b*. The position sensor 243*c* may be mounted on the AF substrate 245 including the coil 243*b* mounted therein.

The carrier 220 is supported by the second housing 230 to be moved in the optical axis (the Z axis) direction. In further detail, ball members 250 are interposed between the carrier 220 and the second housing 230. The ball members 250 play a role in guiding the carrier 220 in a process of AF. In addition, the ball members 250 also play a role in maintaining an interval between the carrier 220 and the second housing 230. The ball members 250 are configured to roll in the optical axis (the Z axis) direction, in a case in which driving power is generated in the optical axis (the Z axis) direction. Thus, the ball members 250 guide movement of the carrier 220 in the optical axis (the Z axis) direction.

Guide grooves 221 and 231 accommodating ball members 250 are formed on one or a combination of surfaces of facing surfaces of the carrier 220 and the second housing 230. The ball members 250 are accommodated in the guide grooves 221 and 231 to be inserted between the carrier 220 and the second housing 230. The guide grooves 221 and 231 may be elongated in the optical axis (the Z axis) direction.

While the ball members 250 are accommodated in the guide grooves 221 and 231, the ball members 250 may not be moved in a first axis (an X axis) and a second axis (a Y axis) direction. The ball members 250 may only be moved in the optical axis (the Z axis) direction. To this end, a planar shape of each of the guide grooves 221 and 231 may be rectangular and elongated in the optical axis (the Z axis) direction.

In an embodiment, in order to maintain a state in which the ball members 250 are in contact with the carrier 220 and the second housing 230, the carrier 220 is pressed toward the second housing 230. Because the lens barrel 210 is inserted into the carrier 220 and fixed thereto, the lens barrel 210 is also pressed toward the second housing 230. To this end, the second housing 230 includes a second yoke 260 mounted therein, in order to face the magnets 241*a* and 243*a* mounted in the carrier 220. The second yoke 260 is a magnetic material.

The second yoke 260 and the magnets 241*a* and 243*a* are magnetically attractive. Thus, the carrier 220 may be moved in the optical axis (the Z axis) direction by driving power of the second driving portion 240 while the carrier 220 is in contact with the ball members 250. In addition, the lens barrel 210 fixed to the carrier 220 is configured to move in a direction different from a direction in which the lens barrel 210 is pressed (e.g., the Y-axis direction). In other words, the lens barrel 210 is pressed in the Y-axis direction and is configured to move in the optical axis (the Z axis) direction.

Figure 21:
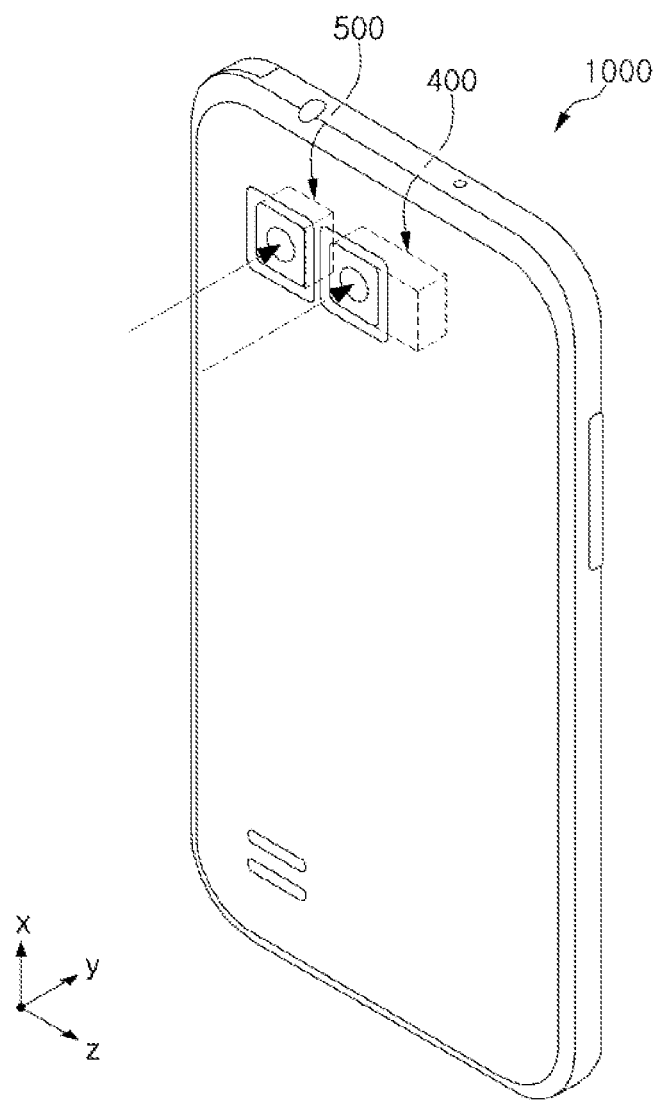
FIG. 21 is a perspective view of a portable electronic device according to an example.

FIG. 21 is a perspective view of a portable electronic device according to an example. With reference to FIG. 21, a portable electronic device 1000 according to an example may be provided as a portable electronic device, such as a mobile communications terminal, a smartphone, a personal computer (PC), a PC monitor, a tablet PC, a laptop computer, a virtual reality (VR) apparatus, an augmented reality (AR) apparatus, or a mixed reality (MR) apparatus. Portable electronic device 1000 includes camera modules 400 and 500 mounted therein.

In the case of a camera module (400, hereinafter referred to as "a first camera module") among the camera modules 400 and 500, an optical axis (a Z axis) is disposed to be perpendicular to a thickness direction. As described in this case, the thickness direction is a Y-axis direction, a direction from a front surface of a portable electronic device to a rear surface thereof, or the opposite direction, of the portable electronic device 1000 as described with reference to FIGS. 2A to 20. In an embodiment, a first camera module 400 may include a telescopic lens having a relatively long focal length. In addition, the telescopic lens of the first camera module 400 may satisfy TTL/f<1. In this expression, TTL is a distance from an object-side surface of a lens disposed closest to an object among a plurality of lenses to an imaging surface of an image sensor with respect to the optical axis (the Z axis). Further, f is a total focal length of the telescopic lens (plurality of lenses) in the expression.

In the case of the other camera module (500, hereinafter referred to as "a second camera module") among the plurality of camera modules 400 and 500, the optical axis (the Y axis) is disposed in the thickness direction (i.e., the Y-axis direction) of the portable electronic device 1000. In an embodiment, a second camera module 500 may include a wide-angle lens having a relatively short focal length. In addition, the wide-angle lens of the second camera module 500 may satisfy the expression TTL/f>1 (where again TTL is a distance from an object-side surface of a lens disposed closest to the object to an imaging surface and f is a total focal length of the plurality of lens).

A back focal length (BFL) of the first camera module 400 may be longer than that of the second camera module 500. As described here, BFL is a distance from an image-side surface of a lens disposed closest to an image sensor among a plurality of lenses to an imaging surface of the image sensor (with respect to the optical (Z) axis).

In the meantime, the optical axis (the Z axis) of the first camera module 400 may be disposed to be perpendicular to the optical axis (the Y axis) of the second camera module 500. Because, in the case of a camera module having a telescopic function, a focal length thereof is formed to be relatively long, a size thereof may be greater than that of a camera module having a wide-angle function. Thus, a total size of the portable electronic device 1000 may be undesirably increased (e.g., a thickness of the portable electronic device 1000). However, in the example above, the optical axis (the Z axis) of the first camera module 400 having a telescopic function is disposed to be perpendicular to the thickness direction (the Y-axis direction) of the portable electronic device 1000. Thus, an unwanted increase in the size of the portable electronic device 1000 may be prevented.

An angle of view of the first camera module 400 may be formed to be different from that of the second camera module 500. For example, the angle of view of the second camera module 500 is wider than that of the first camera module 400. By designing different angles of view of a plurality of camera modules, an image of a subject may be captured at various depths. For example, in a case in which a subject disposed at an equal distance is captured by the first camera module 400 and the second camera module 500, the first camera module 400 having a relatively narrow angle of view captures an image having a relatively shallow depth, while the second camera module 500 having a relatively wide angle of view captures a relatively deeper image.

In addition, a zoom function may be implemented using a plurality of images, while a three-dimensional image may also be implemented. Furthermore, an image having high resolution may be generated using two images of a single subject (i.e., synthesis of the images) or a bright image may be generated. Thus, a clear image of a subject may be captured even in low luminance environments.

As set forth above, according to examples of the disclosure, a camera module and a portable electronic device including the same implementing a function, such as an AF function, a zoom function, an OIS function, and the like, and having a relatively simple structure and a relatively small size may be provided. In addition, power consumption of the camera module may be minimized.

While this disclosure includes specific examples, it will be apparent after an understanding of the application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a lens module comprising lenses; and
    a reflecting module disposed in front of the lens module and configured to change a path of light to direct light incident on the reflecting module toward the lens module,
    wherein the reflecting module comprises
        a reflecting member configured to change the path of light,
        a holder in which the reflecting member is mounted,
        a first housing accommodating the holder, and
        a first driving portion providing driving force to the holder,
    wherein the holder is configured to be rotated with respect to two axes by the first driving portion,
    wherein the first driving portion comprises:
        a first magnet disposed on a side surface of the holder;
        a second magnet disposed on a surface perpendicular to the side surface of the holder;
        a first coil disposed to face the first magnet; and
        a second coil disposed to face the second magnet, and
    wherein the holder is configured to be pressed toward the first housing.

2. The camera module of claim 1, wherein a magnetic material is disposed on one of the holder and the first housing, and a magnet is disposed on the other thereof.

3. The camera module of claim 1, wherein ball members are disposed between the holder and the first housing.

4. The camera module of claim 1, wherein a substrate is disposed in the first housing, and the first coil and the second coil are disposed on the substrate.

5. The camera module of claim 1, wherein the reflecting module further comprises a first position sensor and a second position sensor, the first position sensor is disposed on an internal side or an external side of the first coil, and the second position sensor is disposed on an internal side or an external side of the second coil.

6. The camera module of claim 1, wherein the reflecting member is a mirror or a prism.

7. The camera module of claim 1, wherein the holder comprises a mounting surface on which the reflecting member is mounted, and the mounting surface is an inclined surface.

8. The camera module of claim 1, wherein the two axes are perpendicular to each other.

9. The camera module of claim 1, wherein the lens module further comprises a lens barrel accommodating the lenses, the lens barrel has a shorter length in a second axis direction than in a first axis direction, the first axis direction is perpendicular to an optical axis direction of the lenses, and the second axis direction is perpendicular to both the first axis direction and the optical axis direction.

10. The camera module of claim 1, wherein the lenses have a shorter length in a second axis direction than in a first axis direction, the first axis direction is perpendicular to an optical axis direction of the lenses, and the second axis direction is perpendicular to both the first axis direction and the optical axis direction.

11. The camera module of claim 1, wherein the lens module further comprises:
    a lens barrel including the lenses;

a carrier in which the lens barrel is mounted; a second housing accommodating the carrier; and a second driving portion configured to change a distance between the carrier and the reflecting module by moving the carrier.

12. The camera module of claim 11, wherein ball members configured to guide movement of the carrier are disposed between the carrier and the second housing.

13. The camera module of claim 12, wherein guide grooves in which the ball members are disposed are formed on one or a combination of surfaces of facing surfaces of the carrier and the second housing, and the guide grooves are elongated in an optical axis direction of the lenses.

14. The camera module of claim 11, wherein the second driving portion comprises magnets mounted in the carrier and coils disposed in the second housing to face the magnets, and a second yoke is mounted in the second housing, the second yoke configured to attract the magnets.

15. A reflector comprising:
a reflecting member configured to change a path of incident light;
a holder in which the reflecting member is disposed;
a housing accommodating the holder; and
a driving portion providing driving force to the holder,
wherein the holder is configured to be rotated with respect to a first axis and a second axis,
wherein the driving portion comprises:
a first magnet disposed on a side surface of the holder;
a second magnet disposed on a surface perpendicular to the side surface of the holder;
a first coil disposed to face the first magnet; and
a second coil disposed to face the second magnet, and
wherein ball members are disposed between the holder and the housing.

16. The reflector of claim 15, wherein a substrate is disposed in the housing, and the first coil and the second coil are disposed on the substrate.

17. The reflector of claim 15, further comprising a first position sensor and a second position sensor,
wherein the first position sensor is disposed on an internal side or an external side of the first coil, and the second position sensor is disposed on an internal side or external side of the second coil.

18. The reflector of claim 15, wherein the first axis and the second axis are perpendicular to each other.

* * * * *